(12) United States Patent
Rahbar et al.

(10) Patent No.: US 12,407,173 B2
(45) Date of Patent: Sep. 2, 2025

(54) ELECTRICAL POWER SYSTEM AND A MULTI-TIMESCALE COORDINATED OPTIMIZATION SCHEDULING METHOD THEREFOR

(71) Applicant: UNIVERS PTE. LTD., Singapore (SG)

(72) Inventors: Katayoun Rahbar, Singapore (SG); Sajitha Nair, Singapore (SG); Peng Peng, Singapore (SG); Chuan Luo, Singapore (SG)

(73) Assignee: UNIVERS PTE. LTD., Singapore (SG)

( * ) Notice: Subject to any disclaimer, the term of this patent is extended or adjusted under 35 U.S.C. 154(b) by 0 days.

(21) Appl. No.: 18/282,116

(22) PCT Filed: Mar. 2, 2022

(86) PCT No.: PCT/SG2022/050107
§ 371 (c)(1),
(2) Date: Sep. 14, 2023

(87) PCT Pub. No.: WO2023/167631
PCT Pub. Date: Sep. 7, 2023

(65) Prior Publication Data
US 2024/0275179 A1    Aug. 15, 2024

(51) Int. Cl.
*H02J 3/46* (2006.01)
*H02J 3/00* (2006.01)

(52) U.S. Cl.
CPC .............. *H02J 3/466* (2020.01); *H02J 3/003* (2020.01); *H02J 3/004* (2020.01); *H02J 2300/24* (2020.01)

(58) Field of Classification Search
CPC .. H02J 3/466; H02J 3/003; H02J 3/004; H02J 2300/24
See application file for complete search history.

(56) References Cited

U.S. PATENT DOCUMENTS

2012/0191333 A1* 7/2012 Sawhill ................... G08G 5/53
701/122
2012/0296482 A1* 11/2012 Steven ................... G06Q 40/04
700/291

(Continued)

FOREIGN PATENT DOCUMENTS

AU        2020327343 A1    12/2021
CN        109301853 A      2/2019

(Continued)

OTHER PUBLICATIONS

International Search Report and Written Opinion of International Searching Authority with mailing date of May 24, 2022 for International Application No. PCT/SG2022/050107.

(Continued)

*Primary Examiner* — Ziaul Karim
(74) *Attorney, Agent, or Firm* — JCIP; Joseph G. Chu

(57) ABSTRACT

A multi-timescale coordinated optimization scheduling method for an electrical power system that includes a number of distributed energy resources (DERs) is disclosed. The method includes performing long-timescale optimization scheduling for the electrical power system based at least on renewable energy generation forecast data of the DERs to obtain long-timescale operation planning data. The method further includes performing mid-timescale optimization scheduling for the electrical power system based on the long-timescale operation planning data and measured data of the DERs to obtain mid-timescale operation planning data. The method further includes performing at least close to real-time optimization scheduling for the electrical power system based on the mid-timescale operation planning data, the measured data of the DERs and grid signals of the electrical power system to obtain short-timescale power (Continued)

setpoints for the DERs. An electrical power system in which the method is used is also disclosed.

20 Claims, 5 Drawing Sheets

(56) References Cited

U.S. PATENT DOCUMENTS

| | | | | |
|---|---|---|---|---|
| 2016/0258361 | A1* | 9/2016 | Tiwari | G06Q 10/06 |
| 2020/0027096 | A1* | 1/2020 | Cooner | G06Q 40/04 |
| 2022/0029424 | A1* | 1/2022 | Burra | H02J 3/48 |

FOREIGN PATENT DOCUMENTS

| | | |
|---|---|---|
| CN | 110311421 A | 10/2019 |
| CN | 111525626 A | 8/2020 |
| CN | 111541272 A | 8/2020 |
| CN | 113285485 A | 8/2021 |
| CN | 113822547 A | 12/2021 |

OTHER PUBLICATIONS

Written Opinion of the International Preliminary Examining Authority with mailing date of Jan. 11, 2023 for International Application No. PCT/SG2022/050107.

International Preliminary Report on Patentability with completion date of Mar. 16, 2023 for International Application No. PCT/SG2022/050107.

Co-optimizing Battery Storage for the Frequency Regulation and Energy Arbitrage Using Multi-Scale Dynamic Programming by B. Cheng, and W.B. Powell, in the engineering journal IEEE Trans. Smart Grid, vol. 9, No. 3, 2018.

Nammouchi Amal et al: "Integration of AI, IoT and Edge-Computing for Smart Microgrid Energy Management", 2021 IEEE International Conference on Environment and Electrical Engineering and 2021 IEEE Industrial and Commercial Power Systems Europe (EEEIC / I&CPS Europe), IEEE, Sep. 7, 2021 (Sep. 7, 2021), pp. 1-6.

Ming Yu et al: "Hierarchical control of DC microgrid based on model predictive controller", IECON 2016—42nd Annual Conference of the IEEE Industrial Electronics Society, IEEE, Oct. 23, 2016 (Oct. 23, 2016), pp. 4139-4144.

European Search report for 22929227.1 mailed on Apr. 3, 2025.

* cited by examiner

ELECTRICAL POWER SYSTEM AND A MULTI-TIMESCALE COORDINATED OPTIMIZATION SCHEDULING METHOD THEREFOR

TECHNICAL FIELD

This invention relates to an electrical power system and a multi-timescale coordinated optimization scheduling method used therein. More particularly, this invention relates to an energy management system that uses the multi-timescale coordinated optimization scheduling method for commanding controllers of distributed energy resources in the electrical power system.

BACKGROUND

The following discussion of the background to the invention is intended to facilitate an understanding of the present invention only. It should be appreciated that the discussion is not an acknowledgement or admission that any of the material referred to was published, known or part of the common general knowledge of the person skilled in the art in any jurisdiction as at the priority date of the invention.

In recent years integration of distributed energy resources (DERs) into electrical power systems has been a growing trend, almost globally. Among DERs, renewable energy resources, such as solar and wind, have been recognized as an environmentally and economically beneficial solution for the future smart grids. This is so because they reduce carbon dioxide emissions that is often associated with conventional fossil-fuel-based generation. To alleviate the intermittent and stochastic generation of these renewable generators, battery energy storage systems (BESSs) have been widely deployed to improve the electrical power system's stability and reliability. Moreover, in recent years, incentive programs have unlocked revenue streams for the DERs by utilizing their flexibilities in participating in the different electricity markets such as in providing balancing and ancillary services.

To achieve reliability and resilience, and maximize economic benefits of the operation of the electrical power system, it is desirable to have an energy management system that enables the flexible integration of various DER models and also achieves the lowest operation cost for such integrated electrical power systems. However, coordination among multiple DERs, different requirements for market participation, and the challenges arising from renewable energy and load demand fluctuations complicate the goal of achieving a low operational cost across multiple time horizons from long-term (year, month, and week) to short-term (day, intra-day and hour) and in real-time.

BACKGROUND

The key challenges for such an energy management system includes multitimescale optimization, cost efficiency and optimization, and uncertainties of generation and demand. With regard to multi-timescale optimization, one of the critical challenges in the electrical power system with integrated DERs is to design one unified system to address several needs: from long-term operation planning to provide advisory for the system operation and market participation hours/days ahead of time all the way up to minutes and seconds level of scheduling and dispatching control signals to controllers of the DERs. All these requirements cannot be easily addressed through a single optimizer with a single time interval over the scheduling horizon. The energy management system requires different levels/layers of optimization, each with its own specific time interval and scheduling horizon ranges. The coordination, information flow, and synergy among these multi-timescale engines with their individual computation time and other requirements, introduce new challenges for the optimization of energy management systems with integrated DERs. A simplified example of a system with multi-timescale engines has been published in the article "Co-optimizing Battery Storage for the Frequency Regulation and Energy Arbitrage Using Multi-Scale Dynamic Programming" by B. Cheng, and W.B. Powell, in the engineering journal IEEE Trans. Smart Grid, vol. 9, no. 3, 2018.

Besides multi-timescale optimization, another goal of the electrical power system with integrated DERs is to achieve the lowest operation cost of the system, while meeting the overall system as well as individual DER's requirements and constraints. Specifically, each asset is associated with its unique operational costs and practical constraints. An optimal solution that achieves cost efficiency for the entire system is non-trivial. Detailed mathematical modelling of physical assets and problem formulation based on business needs and targets which necessitates the use of advanced optimization techniques is required.

Due to stochastic and intermittent power generation of renewable energy generators, variability in the availability of assets, uncertainties in load demands, etc., new challenges arise for the reliable and stable operation of the electrical power system. As an example, the mismatch between renewable energy generation and load demand may lead to demand outage (in the case of insufficient renewable energy) or result in energy wastage (in the opposite case of excessive renewable energy generation). Therefore, a solution derived solely from forecast data cannot capture the real-time renewable energy or load fluctuations.

Among existing algorithms used in the energy management system, they are either meant for simplified systems/models or are based on heuristic online algorithms, which rely solely on actual measurement data to set the real-time power dispatch. Specifically, heuristic online algorithms are based on priority/rule-based dispatch techniques, which can generally fulfil only certain objectives with selected modes based on pre-defined thresholds. As an example, the dispatch rule of DERs can be set based on specific functionalities of "minimization of electricity procurement cost", "maximization of renewable energy generation", etc. Accordingly, pre-defined priorities will be given to dispatch the DERs. For the case of "minimization of electricity procurement cost", the order of DER would be renewable, BESS, and electric grid. In this rule-based algorithm, to realize the generation (electric supply) and load (electric demand), first the renewable energy generator is used to follow the load profile as much as possible, followed by the BESS and eventually the power grid. One important drawback of these pre-defined rule-based techniques is their incapability in achieving the optimal solution. For the objective of "minimization of electricity procurement cost", if the price of grid electricity purchase is non-uniform over time, it is understood that the proposed heuristic algorithm which is rule-based and makes decision based on the actual measurement data cannot achieve the optimal solution as the BESS is not being charged/discharged by considering the future forecast and trend of electricity price. Even if achieving optimality can be proven, it may not hold if there is any change in the electrical power system, e.g., addition of a new DER model. Hence, these existing algorithms are not flexible to maintain their performance once there are changes in the electrical power system design, type/number of DERs, etc.

Another widely used online algorithm for the close to real-time energy management which tackles the uncertainties in the electrical power systems is dynamic programming. Dynamic programming requires prediction errors of renewable energy/load profiles to follow certain stochastic processes with known probability distributions (e.g., stationary or cyclostationary stochastic processes). However, the renewable energy generation and/or the load demand cannot be exactly modelled by stationary or cyclostationary processes. As a result, it may not be practically valid to model forecast errors as such processes with known probability distributions. Besides, due to the notorious "curse of dimensionality" problem, obtaining an optimal solution by dynamic programming, in general, has an exponentially growing complexity with the number of decision variables, especially as the number of decision variables becomes very large.

There is therefore a need for an energy management system for use in an electrical power system which addresses, at least in part, one or more of the forgoing problems.

SUMMARY

According to an aspect of the present disclosure, there is provided a multi-timescale coordinated optimization scheduling method for an electrical power system that includes a number of distributed energy resources (DERs). The method includes performing long-timescale optimization scheduling for the electrical power system based at least on forecast data to obtain long-timescale operation planning data. The method further includes performing mid-timescale optimization scheduling for the electrical power system based on the long-timescale operation planning data and measured data of the DERs to obtain mid-timescale operation planning data. The method further includes performing at least close to real-time optimization scheduling for the electrical power system based on the mid-timescale operation planning data, the measured data of the DERs and grid signals of the electrical power system to obtain short-timescale power setpoints for the DERs.

In some embodiments of the method, the long-timescale optimization scheduling is performed via cloud computing; and the short-timescale optimization scheduling and at least close to real-time optimization scheduling are performed via edge computing.

In some embodiments of the method, the method further includes obtaining interpolated long-timescale operation planning data based on the long-timescale operation planning data. And performing mid-timescale optimization scheduling for the electrical power system based on the long-timescale operation planning data and measured data of the plurality of DERs to obtain mid-timescale operation planning data includes based on the interpolated long-timescale operation planning data, and the measured data of the plurality of DERs to obtain mid-timescale operation planning data.

In some embodiments of the method, the method further includes obtaining interpolated forecast data based on the forecast data; and obtaining blended forecast data based on the interpolated forecast data and the measured data of the plurality of DERs. In these embodiments, performing mid-timescale optimization scheduling for the electrical power system based on the long-timescale operation planning data and measured data of the plurality of DERs to obtain mid-timescale operation planning data includes performing mid-timescale optimization scheduling for the electrical power system based on the interpolated long-timescale operation planning data, the blended forecast data and the measured data of the plurality of DERs to obtain mid-timescale operation planning data.

In some embodiments of the method, obtaining interpolated forecast data and/or interpolated long-timescale operation planning data is performed asynchronously from the mid-timescale optimization scheduling.

In some embodiments of the method, performing mid-timescale optimization scheduling includes performing Model Predictive Control (MPC)-based mid-timescale optimization scheduling.

In some embodiments of the method, the method further includes performing mid-timescale optimization scheduling for the electrical power system based on the forecast data and the measured data of the plurality of DERs to obtain mid-timescale operation planning data if long-timescale operation planning data is not available.

In some embodiments of the method, the long-timescale operation planning data includes at least an hour-ahead planning data.

In some embodiments of the method, the mid-timescale operation planning data includes at least a minute-ahead operation planning data corresponding to the at least an hour-ahead planning data.

In some embodiments of the method, the forecast data comprises price, load and renewable energy generation forecast data.

According to another aspect of the present disclosure, there is provided an electrical power system. The electrical power system includes a number of distributed energy resources (DERs) and an energy management system. The energy management system includes a long-timescale scheduler, a mid-timescale scheduler and a real-time scheduler. The long-timescale scheduler is for long-timescale optimization scheduling of the electrical power system based on forecast data to obtain a day-ahead operation planning data. The mid-timescale scheduler is for mid-timescale optimization scheduling of the electrical power system based on the long-timescale operation planning data and measured data of the DERs to obtain mid-timescale operation planning data. The real-time scheduler is for at least close to real-time optimization scheduling of the electrical power system based on the mid-timescale operation planning data, the measured data of the DERs and grid signals of the electrical power system to obtain short-timescale power setpoints for the DERs.

In some embodiments of the system, the long-timescale optimization scheduling is performed via cloud computing; and the mid-timescale optimization scheduling and at least close to real-time optimization scheduling are performed via edge computing.

In some embodiments of the system, the system further includes a data interpolator for obtaining interpolated long-timescale operation planning data based on the long-timescale operation planning data and the forecast data. The mid-timescale scheduler includes a mid-timescale scheduler for mid-timescale optimization scheduling of the electrical power system based on the interpolated long-timescale operation planning data, and the measured data of the plurality of DERs to obtain the mid-timescale operation planning data.

In some embodiments of the system, the data interpolator further obtains interpolated forecast data based on the forecast data. And the mid-timescale scheduler includes a mid-timescale scheduler for mid-timescale optimization scheduling of the electrical power system based on the interpolated long-timescale operation planning data, the interpolated forecast data and the measured data of the plurality of DERs to obtain the mid-timescale operation planning data.

In some embodiments of the system, obtaining interpolated forecast data and/or interpolated long-timescale operation planning data is performed asynchronously from the mid-timescale optimization scheduling.

In some embodiments of the system, the mid-timescale optimization scheduling comprises performing Model Predictive Control (MPC)-based mid-timescale optimization scheduling.

In some embodiments of the system, the mid-timescale scheduler further performs mid-timescale optimization scheduling of the electrical power system based on the forecast data and the measured data of the plurality of DERs to obtain mid-timescale operation planning data if long-timescale operation planning data is not available.

In some embodiments of the system, the long-timescale operation planning data includes at least an hour-ahead planning data.

In some embodiments of the system, the mid-timescale operation planning data includes at least a minute-ahead operation planning data corresponding to the at least one hour-ahead planning data.

In some embodiments of the system, the forecast data comprises price, load and renewable energy generation forecast data.

Other aspects and advantages of the invention will become apparent from the following detailed description, taken in conjunction with the accompanying drawings, illustrating by way of example the principles of the invention.

BRIEF DESCRIPTION OF DRAWINGS

The invention will be better understood with reference to the drawings, in which.

DETAILED DESCRIPTION OF THE EMBODIMENTS

Throughout this document, unless otherwise indicated to the contrary, the terms "comprising", "consisting of", "having" and the like, are to be construed as non-exhaustive, or in other words, as meaning "including, but not limited to."

Furthermore, throughout the specification, unless the context requires otherwise, the word "include" or variations such as "includes" or "including" will be understood to imply the inclusion of a stated integer or group of integers but not the exclusion of any other integer or group of integers.

Throughout the description, it is to be appreciated that the term 'processor' and its plural form include microcontrollers, microprocessors, programmable integrated circuit chips such as application specific integrated circuit chip (ASIC), computer servers, electronic devices, and/or combination thereof capable of processing one or more input electronic signals to produce one or more output electronic signals. The controller includes one or more input modules and one or more output modules for processing of electronic signals.

Throughout the description, it is to be appreciated that the term 'server' and its plural form can include local, distributed servers, and combinations of both local and distributed servers.

Unless defined otherwise, all technical and scientific terms used herein have the same meaning as is commonly understood by a skilled person to which the subject matter herein belongs.

Figure 1:
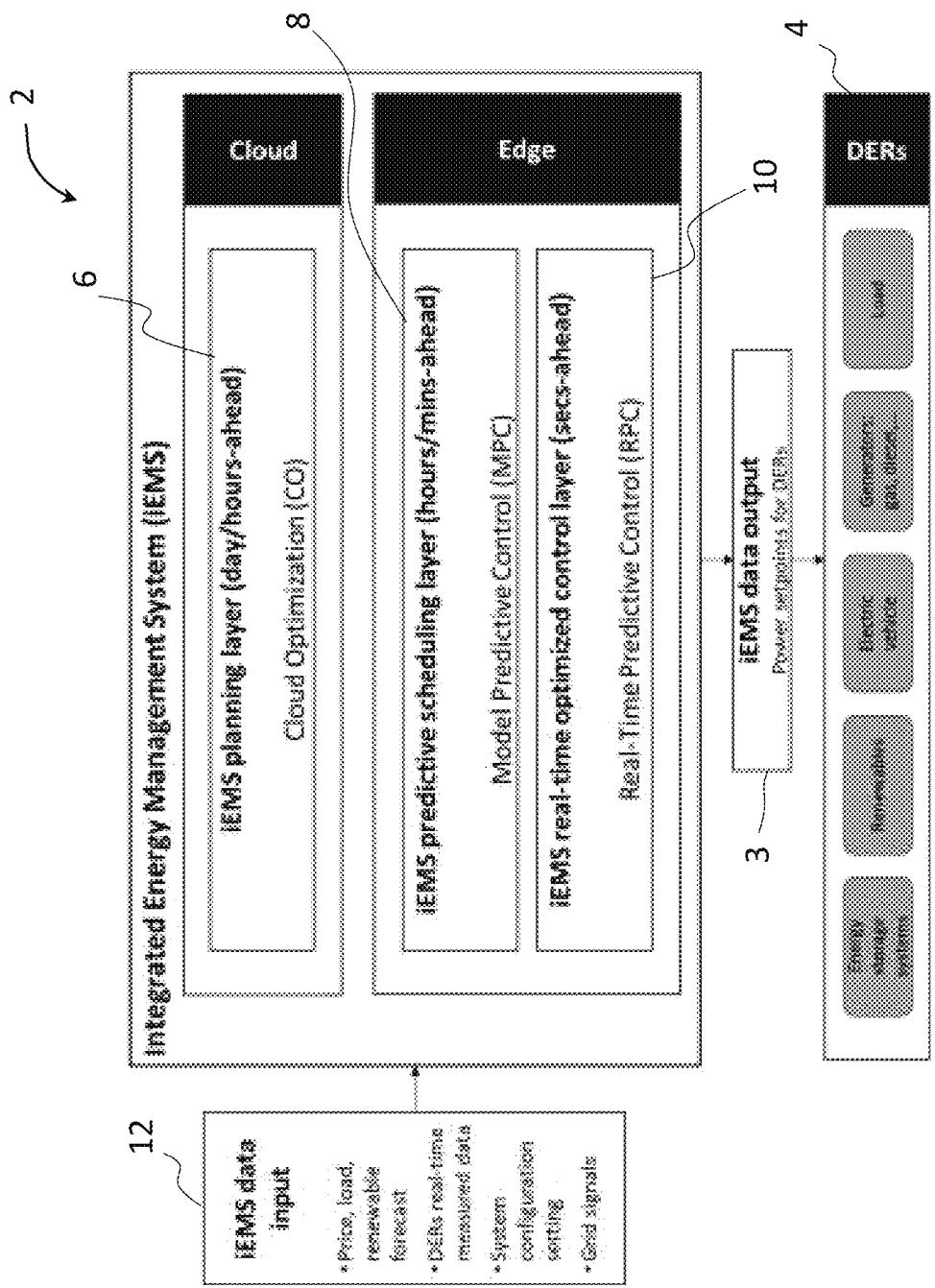
FIG. 1 is a high-level block diagram of an energy management system according to an embodiment of the present disclosure.
Figure 2:
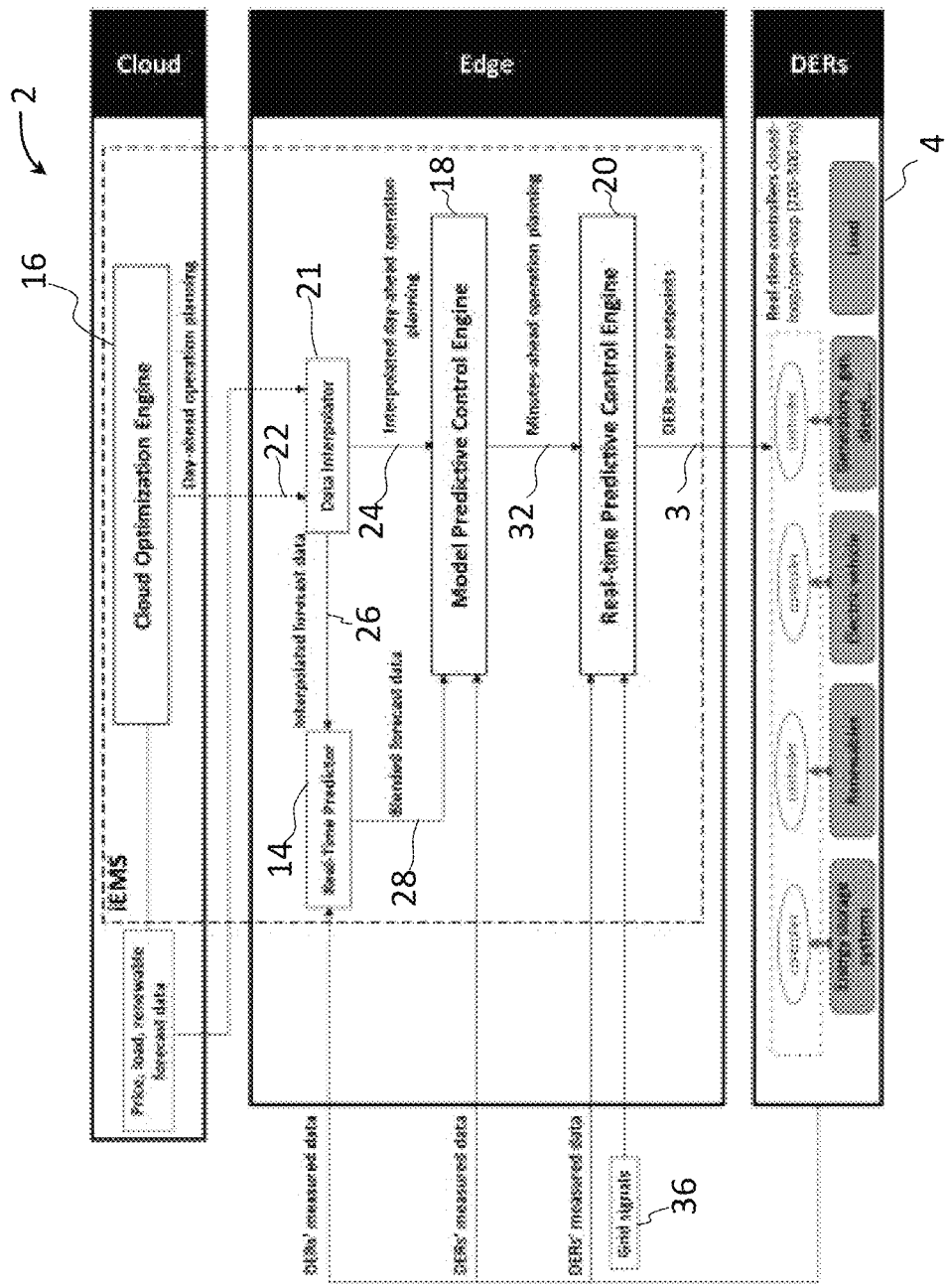
FIG. 2 is a lower-level block diagram of the energy management system in FIG. 1, the energy management system including a cloud optimization engine, a data interpolator, a real-time predictor, a model predictive control engine, and a real-time predictive control engine.

As shown in the drawings for purposes of illustration, the invention may be embodied in a multi-timescale coordinated optimization scheduling method for an electrical power system including a number of distributed energy resources (DERs) that is able to generate power setpoints for the DERs based on near real-time or real-time data. Referring to FIGS. 1 and 2, the method includes performing long-timescale optimization scheduling for the electrical power system based on forecast data to obtain a long-timescale operation planning data; performing mid-timescale optimization scheduling for the electrical power system based on the long-timescale operation planning data and measured data of the DERs to obtain mid-timescale operation planning data; and performing at least close to real-time optimization scheduling for the electrical power system based on the mid-timescale operation planning data, the measured data of the DERs and grid signals of the electrical power system to obtain short-timescale power setpoints for the DERs.

Specifically, FIG. 1 shows an energy management system 2 according to one embodiment of the present disclosure. The energy management system 2 is coupled to an electrical power system (not shown) to provide power setpoints 3 for a number of DERs 4 of the electrical power system. The DERs 4 include but are not limited to energy storage systems, renewable energy generators, electric vehicles, gas, diesel and other types of generators, controllable or fixed loads, etc. The energy management system 2 includes a planning layer 6, a predictive scheduling layer 8 and a real-time optimized control layer 10. Input data 12 to the energy management system includes, but is not limited to, data relating to price, load, renewable energy generation forecast, real-time measured data of the DERs 4, system configuration settings and electrical power grid signals. The energy management system 2 processes the input data 12 to generate output data that includes the power setpoints 3 for the DERs 4.

The planning layer 6 processes forecast data of the input data 12 to generate long-timescale operation planning data that includes in one embodiment hours-ahead operation planning trajectories. The two downstream layers, namely the predictive scheduling layer 8 and the real-time optimized control layer 10 incorporate actual measurement data of the DERs 4 while respecting some of the hours-ahead operation planning data computed in the upstream planning layer 6. The two downstream layers 8, 10 re-optimize some of the operation planning data from the planning layer 6. The predictive scheduling layer 8 and the real-time optimized control layer 10 are executed more frequently than the planning layer 6 to take into account real-time changes in the DERs' measured data. Since these layers 8, 10 are executed more frequently, they can be of a shorter scheduling duration and have a reduced set of constraints compared to the planning layer 6, if need be. This is especially so for the real-time optimized control layer 10, which works typically in real-time, i.e., in a matter of seconds. A model predictive control (MPC) algorithm and a real-time predictor 14 are used in the predictive scheduling layer 8 to take advantage of both the forecast data and real-time measured data of the DERs 4. The energy management system 2 models the costs and constraints of each DER 4 using detailed mathematical modeling. Mathematical modeling will be described in more details later. With this detailed modeling, the components of the electrical power system are jointly optimized.

The energy management system 2 is next described in more detail with the aid of FIGS. 2-10. The operation of the energy management system 2 is split between cloud computing and edge computing for optimal scheduling and real-time predictive control of the DERs 4. Each of the three layers 6, 8, 10 includes an optimization engine/scheduler 16, 18, 20. Each engine 16, 18, 20 may require static and/or time-series input data from the other two optimization engines 16, 18, 20 and also a data interpolator 21, a real-time predictor 14, price, load, renewable forecasters 12, a human machine interface (HMI) 44 (FIG. 10), and real-time measured data from the DERs 4, where applicable.

The planning layer 6 runs on the cloud. In other embodiments, this planning layer 6 may also run on edge devices. As known to those skilled in the art, clouds are places where data can be stored or applications can run. They are software-defined environments created by datacenters or server farms. Cloud computing is an act of running workloads in a cloud. Edges are also places where data are collected. They are physical environments made up of computing hardware outside a datacenter. Edge computing is also an act of running workloads but on edge devices instead of the cloud. Edge computing involves collecting and processing data at the edge. Edge computing is separate from clouds in terms of time sensitivity and data volume. The rate at which a decision needs to be made doesn't allow for the lag that would normally take place as data is collected by an edge device, transferred to a central cloud without modification, and then processed at the cloud before a decision is sent back to the edge device for execution. Edge devices can however contribute to a cloud, if the storage and computing capabilities provided by those edge devices at the endpoints of a network are abstracted, pooled, and shared across a network-essentially becoming part of a larger cloud infrastructure.

When run on the cloud, this long-timescale scheduler 16 may be conveniently referred to as a cloud optimization (CO) engine 16 which is formulated as a mixed integer programming (MIP) optimization problem and optimally derives operation planning by solving the energy scheduling problem over hours to days scheduling time horizon based on future forecast data, such as but not limited to, load, price, and renewable energy generation prediction, etc. To cater to errors in the forecasted load, price, and renewable energy generation prediction, a finite number of stochastic scenarios are used to represent the potential uncertain cases. Each scenario is associated with a probability distribution of its occurrence. The CO engine 16 can then utilize the stochastic scenarios to capture the uncertainty of the data and the potential forecast errors in the optimization. In addition, the planning layer 6 can be configured to run on edge devices.

The predictive scheduling layer 8 and the real-time optimized control layer 10 run on the edge. There is an optimization engine 18, 20 in each of these two layers 8, 10. The predictive scheduling layer 8 includes a mid-timescale scheduler 18, referred to hereinafter as a model predictive control (MPC) engine 18. The real-time optimized control layer 10 includes a real-time scheduler 20, referred to hereinafter as a real-time predictive control (RPC) engine 20. The MPC engine 18 and the RPC engine 20 provide high resolution, i.e., minutes to seconds, optimal control strategies for the DERs 4. These engines 18, 20 leverage more accurate forecast data in minutes resolution together with actual measurement data and comply with operation planning results derived from the upstream CO engine 16. These engines 18, 20 derive more accurate operation targets for controllers of the DERs 4 and can also follow energy and regulation signals of the electrical power system in seconds resolution. These energy and regulation signals include, but are not limited to, grid operation signal which is in fact power setpoints from a system operator and frequency regulation signal. The RPC engine 20 is preferably a lightweight optimization engine solving a linear programming (LP) optimization problem, which computes accurate binding operation targets for the downstream controllable DERs 4. The output of the RPC engine 20 are short-timescale power setpoints for the DERs 4 that are controllable.

Figure 3:
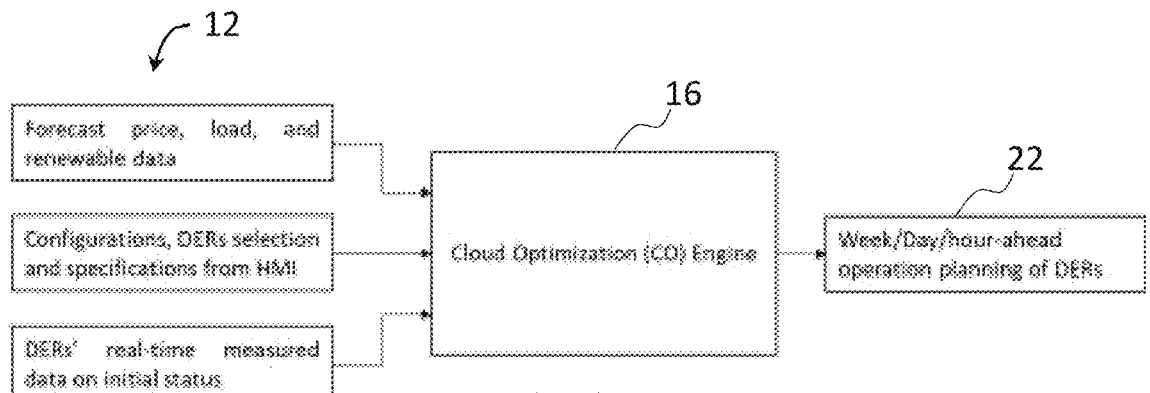
FIG. 3 is block diagram of the cloud optimization engine of the energy management system in FIG. 2.

The operation of the three optimization engines 16, 18, 20, namely the CO engine 16, the MPC engine 18, and the RPC engine 20 is described in more detail next. FIG. 2 is a detailed block diagram of the energy management system 2. The CO engine 16 utilizes parameterized system modeling and advanced optimization to mathematically model the components of the electrical power system and formulate a specific business problem as an optimization problem. As an example, the CO engine 16 may target to reduce system costs including but not limited to energy procurement cost, grid uncontracted capacity cost, etc., and increase system revenue including but not limited to ancillary services provision. The CO engine 16 determines long-timescale operation planning data 22, such as but not limited to, day-ahead operation planning data for different controllable DERs 4 through the optimization of certain business objectives. This is carried out based on one or more of price forecast data, load forecast data, renewable energy generation forecast data, demand forecast data over the scheduling horizon, and configurations and specifications of the DERs 4 with their measured data/status at the beginning of a scheduling horizon, as shown in FIG. 3. In other words, the CO engine 16 performs long-timescale optimization scheduling for the electrical power system based on forecast data to obtain the long-timescale operation planning data 22.

Figure 4:
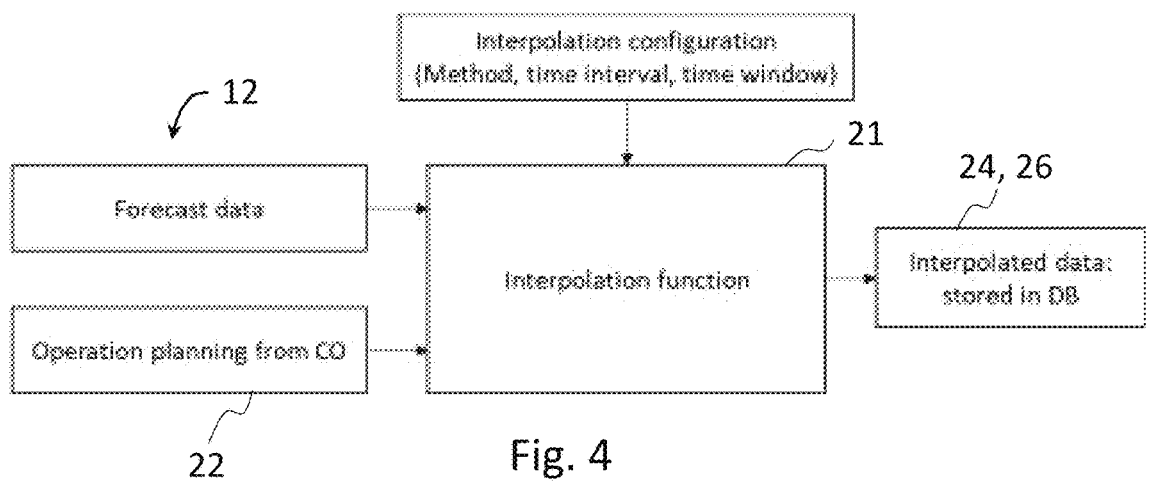
FIG. 4 is a block diagram of the data interpolator in FIG. 2.

The predictive scheduling layer 8 includes the data interpolator 21. This data interpolator 21 is triggered as soon as there is new forecast data 12 from the cloud or new operation planning data 22 from the CO engine 16. The data interpolator 21 interpolates low-resolution day-ahead operation planning data 22 from the CO engine 16 and the forecast data 12 into a high-resolution interpolated long-timescale operation planning data 24 and interpolated forecast data 26, respectively based on any suitable curve fitting method known to those skilled in the art. FIG. 4 shows the specific inputs and output of the data interpolator 21 according to an embodiment. The data interpolator 21 works asynchronously from the MPC and RPC engines 18, 20 in the edge to reduce the data preparation time for these two engines 18, 20. The interpolated long-timescale operation planning data 24 and the interpolated forecast data 26 are stored in a database 27 (FIG. 10) to be utilized by the real-time predictor 14 in the predictive scheduling layer 8 and the MPC and RPC engines 18, 20, whenever necessary.

Figure 5:
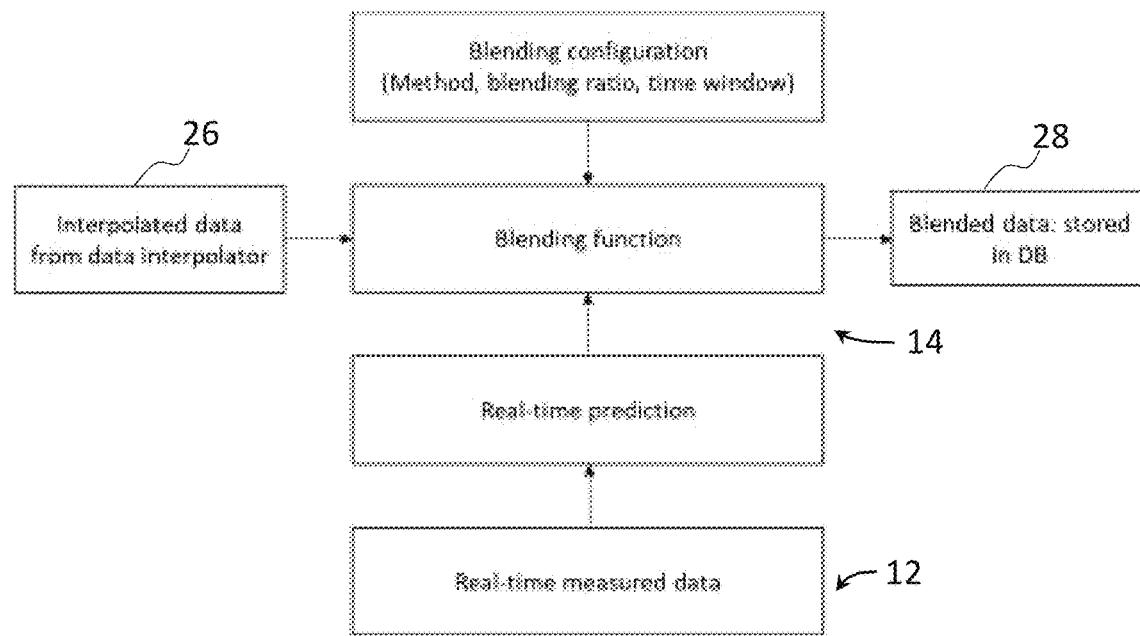
FIG. 5 is a block diagram of the real-time predictor in FIG. 2.

The real-time predictor 14 shown in FIG. 5 is triggered periodically on scheduled runs to do real-time prediction based on edge artificial intelligence and blend the interpolated forecast data 26 from the data interpolator 21 to generate blended forecast data 28. Once triggered, the stored interpolated forecast data 26 is retrieved from the database 27 and blended with real-time measured data of the DERs 4, based on a pre-configured blending method. The blended forecast data 28 of the real-time predictor 14 is stored in the database 27 for use by the MPC and the RPC engines 18, 20, whenever necessary.

Figure 6:
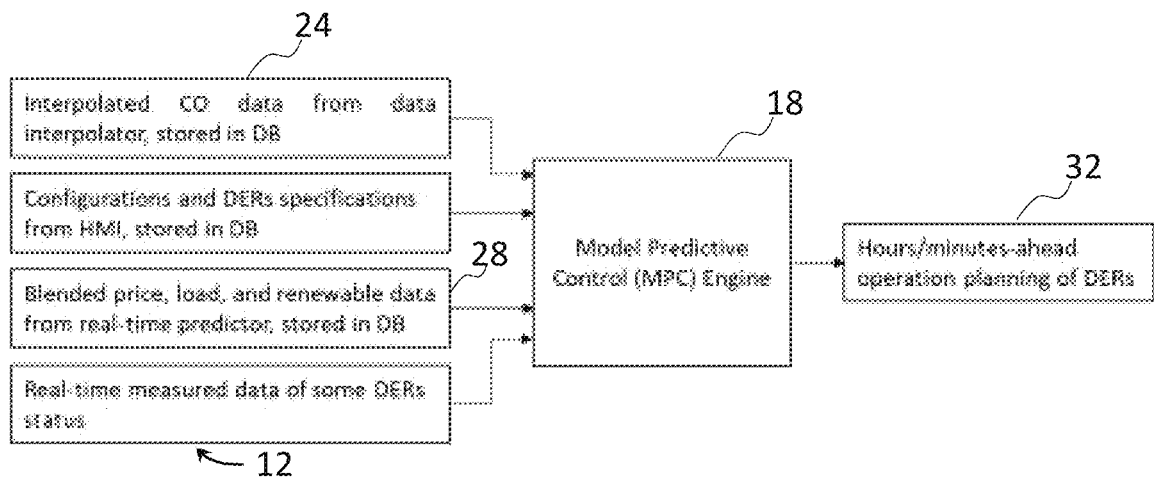
FIG. 6 is a block diagram of the model predictive control engine in FIG. 2.
Figure 9:
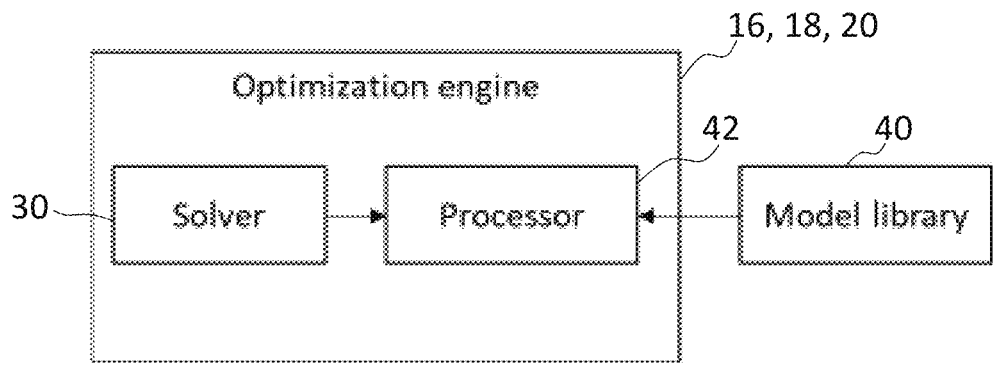
FIG. 9 is a general block diagram of the cloud optimization engine, the model predictive control engine and the real-time predictive control engine.

The MPC engine 18 utilizes parameterized system modeling to mathematically model the components of the electrical power system. It formulates a specific business target as an optimization problem, and outputs an optimal solution in the form of mid-timescale operation planning data 32 using an optimization solver 30 (FIG. 9). The solution is based on one or more of the long-timescale operation planning data 22, high-resolution real-time forecasts 28 of prices, renewable energy generation, and demand over the scheduling horizon along with the configurations, and specifications of the DERs 4 with status and measured data of the DERs 4 at the beginning of a scheduling horizon as input as shown in FIG. 6. In other words, the MPC engine 18 performs mid-timescale optimization scheduling for the electrical power system based on the long-timescale operation planning data 22 and measured data of the DERs 4 to obtain the mid-timescale operation planning data 32.

In this embodiment, the MPC engine 18 relies on receiving data from the CO engine 16 to operate in a dependent mode. Specifically, a more comprehensive optimization problem is first solved by the CO engine 16 to optimally derive some operational setpoints in the long-timescale operation planning data 22 including, but not limited to, the operational modes of the DERs 4 such as BESSs, regulation power capacities, etc. These operational setpoints are then communicated to the MPC engine 18 in the edge. And the MPC engine 18 needs to respect the operational setpoints received from the CO engine 16.

Figure 7:
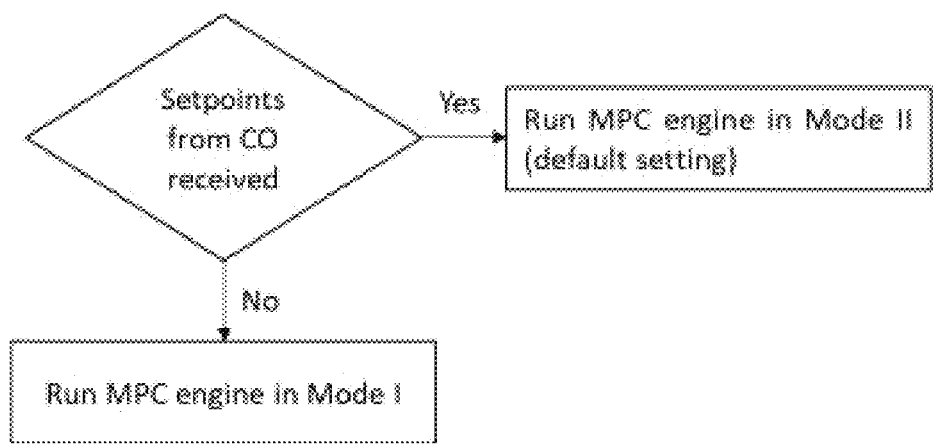
FIG. 7 is a flow diagram showing two modes of operation of the model predictive control engine in FIG. 6.

Alternatively, the MPC engine 18 may work independently of the CO engine 16 in an independent mode. As it is no longer able to rely on the CO engine 16 to perform more comprehensive optimization as described above, the MPC engine 18 will have to include more comprehensive modeling and decision variables in its optimization so that it can continue its operation even when no data is received from the CO engine 16 in the cloud. When it comes time for the MPC engine 18 to run, the MPC engine 18 will operate in either the dependent mode or independent mode depending on whether data, i.e., setpoints in the long-timescale operation planning data 22 is available from the CO engine 16 as shown in FIG. 7. With these two operational modes, the energy management system 2 is more robust against failures, such as failure of the CO engine 16 in the cloud, loss of communication between the cloud and the edge, etc.

Figure 8:
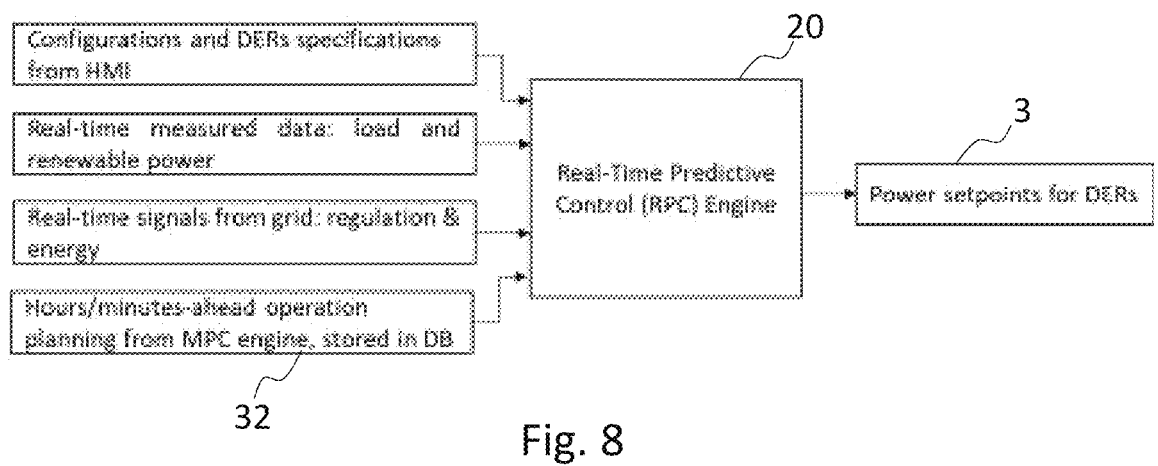
FIG. 8 is a block diagram of the real-time predictive control engine in FIG. 2.

FIG. 8 is a block diagram showing inputs and an output of the RPC engine 20. The RPC engine 20 operates in seconds and aims to track control signals either from the grid (regulation or energy signal) 36 or from the MPC engine 18. It generates short-timescale power setpoints 3 for the controllers of the DERs 4 based on real-time grid signals 36, the DER optimized data 32 from the MPC engine 18, including but not limited to, BESS charging/discharging power references, the actual renewable power generated and load data. In other words, the RPC engine 20 is able to perform close to real-time or real-time optimization scheduling for the electrical power system based on the mid-timescale operation planning data 32, measured data of the DERs 4 and the grid signals 36 of the electrical power system to obtain the short-timescale power setpoints 34 for the DERs 4.

FIG. 9 is a block diagram of an optimization engine, including the CO engine 16, the MPC engine 18, and the RPC engine 20. The optimization engine includes a model library 40 (FIG. 10), which is a detailed mathematical model of all the DERs 4 along with their corresponding costs and constraints. For the BESS, these constraints may include, but are not limited to, power limits, operational modes, regulation power capacity limits, state of charge constraints, etc. The DERs 4 can be included/excluded from the model library 40 and multiple numbers of the same asset type with different settings can be modeled. Flexibility is also provided for different operational requirements. For example, the BESS can be jointly utilized for both frequency regulation and energy scheduling applications, where the power for each application is optimally determined by the CO engine 16 or the MPC engine 18.

The optimization engine further includes a processor 42 and the solver 30. The optimal output of each engine 16, 18, 20 is obtained using the solver 30. Any open-source solver or commercially available solver that is capable of solving the formulated mathematical problem in a desired time may be used.

Figure 10:
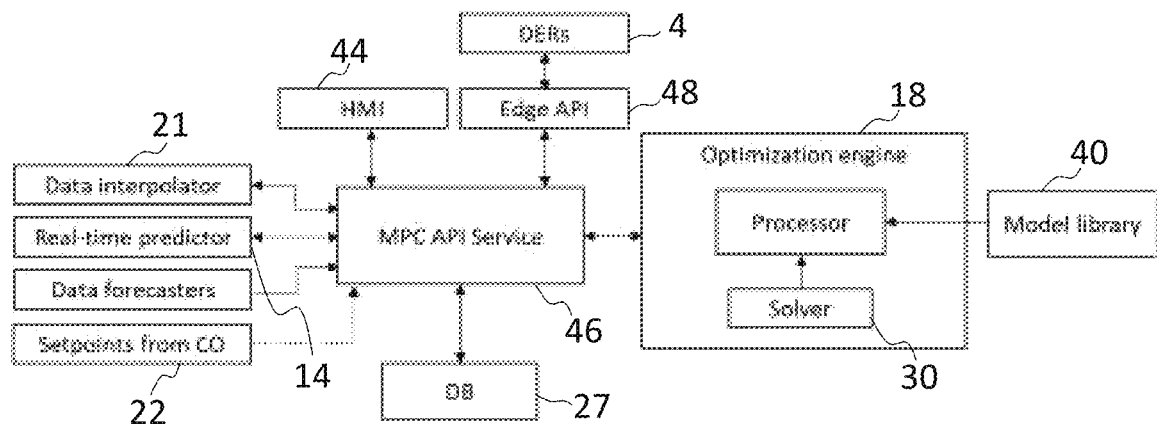
FIG. 10 is a detailed block diagram of the model predictive control engine in FIG. 6.

FIG. 10 is a block diagram showing the relationship between the MPC engine 18 and other blocks of the energy management system 2. The energy management system 2 further includes the human-machine interface (HMI) 44 and an MPC application programming interface (API) 46. The HMI 44 allows a user to configure parameters and settings for each block and to view the results. The MPC API 46 service allows fast database access for the MPC engine 18 via a lightweight communication protocol. The MPC API 46 service acts as a central point of contact for the MPC engine 18. The energy management system 2 further includes an edge API 48 between the MPC API 46 and the DERs 4 for the MPC engine 18 to obtain real-time measured data from the DERs 4 and send control commands to their controllers.

Figure 11:
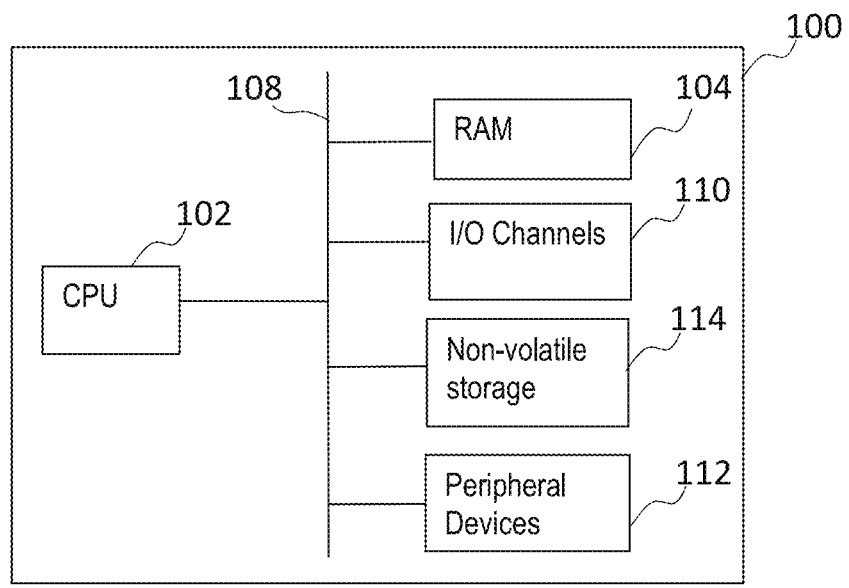
FIG. 11 is a block diagram illustrating typical elements of a computing system that may be appropriately programmed to function as each of the cloud optimization engine in FIG. 3, the model predictive control engine in FIG. 6 and the real-time predictive control engine in FIG. 8.

FIG. 11 is a block diagram illustrating typical elements of a computing system 100 that may be appropriately programmed to function as each of the CO engine 16, the MPC engine 18, and the RPC engine 20. The elements include a programmable processor 102 connected to a system memory 104 via a system bus 108. The processor 102 accesses the system memory 104 as well as other input/output (I/O) channels 110 and peripheral devices 112. The computing system 100 further includes at least one program storage device 114, such as a CD-ROM, tape, magnetic media, EPROM, EEPROM, ROM or the like. The computing system 100 stores one or more computer programs that implement the functions of the CO engine 16, the MPC engine 18 or the RPC engine 20. The processor 102 reads and executes the one or more computer programs to perform the functions. Each of the computer programs may be implemented in any desired computer programming language (including machine, assembly, high level procedural, or object-oriented programming languages). In any case, the language may be a compiled or interpreted language.

During use, the CO engine 16 may run once every half an hour to obtain the long-timescale operation planning data 22 for the next 24 hours. As an example, the CO engine 16 may run for example at 12:07:00. A minute later, at 12:08:00, forecast data and some of the operation planning results of the CO engine 16 are sent from the cloud to the edge. Thirty seconds later, at 12:08:30, the forecast data and the CO engine results 22 received from the cloud are interpolated by the data interpolator 21 and then stored in the database 27 at the edge. At 12:29:00, DERs measurements are feedback from the DERs 4 to the MPC engine 18 and the RPC engine 20. Actual measurement data of renewable energy resources, and load are blended with forecast data by the real-time predictor 14. The MPC engine 18, which runs asynchronously from the data interpolator 21 and the real-time predictor 14 may run once every minute. For example, at time 12:29:15, the MPC engine 18 may have received all the required data and starts to execute. By 12:29:50, the results 32 of the MPC engine 18 is ready. The results 32 from the MPC engine 18 are stored in the database 27 for use in the RPC engine 20. The RPC engine 20, which runs for example once every four seconds, retrieves the MPC results 32 from the database. For the example described above, the RPC engine 20 may run at a time 12:29:56. The RPC engine 20 receives actual measurement data of the load and the renewable energy resources, processes these data to generate power setpoints 3 and sends the power setpoints 3 to the controllers of the DERs 4 at, for example, 12:29:57 which is mere seconds from when the RPC engine 20 starts execution. The controllers of the DERs 4 may receive the power setpoints 3 at a time 12:29:59. The power setpoints 3 may be control signals for the controllers at a time of 12:30:00. In a matter of mere seconds, the RPC engine 20 is able to use the latest data to generate the most current and optimal power setpoints 3 for the controller of the DERs 4.

The mathematical formulation of the optimization engines 16, 18, 20 according to an embodiment is next described in detail. First, all the mathematical notations are defined with a time notation of t. As the three optimization engines 16, 18, 20 are related to each other, several mathematical notations are used in more than one engine 16, 18, 20. Hence, to avoid confusion, for the detailed model of each engine 16, 18, 20, a different time index is used. Specifically, the time index for the MPC engine 18 is denoted by t, the time index for the CO engine 16 is denoted by ty, where the subscript u represents the upper-level CO engine 16 in relation to the MPC engine 18, and finally the time index for the RPC engine 20 is denoted by ty, representing the lower-level RPC engine in relation 20 to the MPC engine 18.

Data types of all parameters and variables used may be classified into four categories with "C" denoting "Continuous" data, "B" denoting "Binary" data, "I" denoting "Integer" data, and "D" denoting "Datetime" data. The parameters and the variables are denoted by symbols with superscripts and subscripts wherein the superscripts indicate asset and time indices, and the subscripts include the asset type and the parameter/variable category.

For the purposes of illustrating mathematical modelling, only DERs 4 including battery energy storage system (BESS), curtailable photovoltaic (CPV), controllable load (CL), and gas turbine (GT) are considered. In other embodiments, one or more of these DERs 4 and other DERs 4 not specifically mentioned herein may also be considered as is known to those skilled in the art. For grid service, the BESS is considered as the only DER providing frequency regulation service, while all the four DERs can follow a given energy setpoint from the grid. The MPC engine 18 has two operation modes as previously described; "Mode I" in which the MPC engine 18 operates independently without receiving any results from the CO engine 16, and "Mode II" in which the MPC engine 18 operates by relying on output results from CO engine 16. The parameters and variables that are specific to each operation mode of the MPC engine 18 will be described later.

A list of sets used in the mathematical modelling is shown in Table 1 below:

TABLE 1

| Set name | Description |
|---|---|
| Asset | |
| ES | Set of battery energy storage systems (BESSs) |
| CPV | Set of curtailable photovoltaics (CPVs) |
| CL | Set of curtailable loads (CLs) |
| GT | Set of gas turbines (GTs) |
| Time | |
| $T_u$ | Set of scheduling time slots in the CO engine 16 |
| T | Set of scheduling time slots in the MPC engine 18 |
| $T_l$ | Set of scheduling time slots in the RPC engine 20 |

A list of indices used in the mathematical modelling is shown in Table 2 below:

TABLE 2

| Index | Description |
|---|---|
| i | Index of asset elements |
| s, $t_u$, t, $t_l$ | Index of time |

A list of system parameters used in the mathematical modelling is shown in Table 3 below:

TABLE 3

| Symbol | Description | Unit | Range | Type |
|---|---|---|---|---|
| Static | | | | |
| $\Delta t_u$ | Time interval duration in the CO engine 16 | hour | (0, ∞) | C |
| $T_u$ | Scheduling window size in the CO engine 16 | — | (0, ∞) | I |
| $\Delta t$ | Time interval duration in the MPC engine 18 | hour | (0, ∞) | C |
| T | Scheduling window size in the MPC engine 18 | — | (0, ∞) | I |
| $\Delta t_l$ | Time interval duration in the RPC engine 20 | hour | (0, ∞) | C |
| $T_l$ | Scheduling window size in the RPC engine 20 | — | (0, ∞) | I |

A list of upstream grid (UG) parameters used in the mathematical modelling is shown in Table 4 below:

TABLE 4

| Symbol | Description | Unit | Range | Type |
|---|---|---|---|---|
| Time-series | | | | |
| $c_{G,E}^{t}$ | Energy procurement price | $/MWh | [0, ∞) | C |
| $c_{G,R}^{t}$ | Regulation price | $/MWh | [0, ∞) | C |
| $\lambda_{R}^{t}$ | Normalized frequency regulation signal | — | [−1, +1] | C |
| $\lambda_{Reg}^{t}$ | Frequency regulation signal | MW | (−∞, ∞) | C |
| $\lambda_{oper}^{t}$ | Grid operation signal | MW | (−∞, ∞) | C |
| Static | | | | |
| $c_{UG, unctr}$ | Uncontracted capacity cost | $/MW | [0, ∞) | C |
| $P_{UG, ctr}$ | Contracted power capacity limit | MW | [0, ∞) | C |
| $P_{G, min}$, $P_{G, max}$ | Power capacity rating of grid connection | MW | (−0, 0], [0, ∞) | C |
| $c_{dev, reg}$ | Cost coefficient of not following frequency regulation signal in the RPC engine 20 | $/MW | (0, ∞) | C |
| $c_{dev, oper}$ | Cost coefficient of not following grid operation signal in the RPC engine 20 | $/MW | (0, ∞) | C |

A list of upstream grid (UG) variables used in the mathematical modelling is shown in Table 5 below:

TABLE 5

| Symbol | Description | Unit | Range | Type |
|---|---|---|---|---|
| Time-series | | | | |
| $P_{G}^{t}$ | Net power to/from the grid: negative means power is exported to the grid; positive means power is imported from the grid | MW | (−∞, ∞) | C |
| $y_{G,1}^{t}$ | Auxiliary variable to linearize cost of deviation from "frequency regulation" signal in the RPC engine 20 | — | [0, ∞) | C |
| $y_{G,2}^{t}$ | Auxiliary variable to linearize cost of not following the "grid operation" signal in the RPC engine 20 | — | [0, ∞) | C |
| Static | | | | |
| $P_{UG, peak}$ | Peak demand capacity | MW | [0, ∞) | C |
| $P_{UG, unctr}$ | Uncontracted power capacity | MW | [0, ∞) | C |

A list of BESS parameters used in the mathematical modelling is shown in Table 6 below:

TABLE 6

| Symbol | Description | Unit | Range | Type |
|---|---|---|---|---|
| Time-series | | | | |
| $P_{ES, CO, d}^{i, t}$ | Interpolated discharging power reference from the CO engine 16 to the MPC engine 18 (only in Mode II of the MPC engine 18) | MW | [0, ∞) | C |
| $P_{ES, CO, c}^{i, t}$ | Interpolated charging power reference from the CO engine 16 to the MPC engine 18 (only in Mode II of the MPC engine 18) | MW | (−∞, 0] | C |
| $P_{ES, MPC, d}^{i, t}$ | Interpolated discharging power reference from the MPC engine 18 to the RPC engine 20 | MW | [0, ∞) | C |
| $P_{ES, MPC, c}^{i, t}$ | Interpolated charging power reference from the MPC engine 18 to the RPC engine 20 | MW | (−∞, 0] | C |
| $\alpha_{ES}^{i, t}$ | Coefficient to project the impact on the state of charge (SOC) following the frequency regulation signal | — | [0, 1] | C |
| $P_{ES, RPC, min}^{i, t}$ | New charging rate reflecting SOC limitations in the RPC engine 20 | MW | (−∞, 0] | C |
| $P_{ES, RPC, max}^{i, t}$ | New discharging rate reflecting SOC limitations in the RPC engine 20 | MW | [0, ∞] | C |
| $P_{ES, soc, min}^{i, t}$, $P_{ES, soc, max}^{i, t}$ | Charging/discharging power rates complying with SOC limitations, calculated in the MPC engine 18 and imposed on the RPC engine 20 | MW | (−∞, 0], [0, ∞] | C |
| Static | | | | |
| $c_{ES, CO}^{i}$ | Cost coefficient of deviation from the CO engine 16 charging/discharging power references (only in Mode II of the MPC engine 18) | $/MW | [0, ∞) | C |
| $c_{ES, MPC}^{i}$ | Cost coefficient of deviation from the MPC engine 18 charging/discharging power references in the RPC engine 20 | $/MW | [0, ∞) | C |
| $c_{ES, cyc}^{i}$ | Cost coefficient for cycling aging | $/MWh | [0, ∞) | C |
| $\eta_{ES, c}^{i}$, $\eta_{ES, d}^{i}$ | Charging and discharging efficiency | — | (0, 1) | C |
| $CAP_{ES}^{i}$ | Nominal capacity | MWh | (0, ∞) | C |
| $P_{ES, min}^{i}$, $P_{ES, max}^{i}$ | Min/max charging and discharging power | MW | (−∞, 0], [0, ∞) | C |

TABLE 6-continued

| Symbol | Description | Unit | Range | Type |
|---|---|---|---|---|
| $P_{ES,R,min}^{i}$, $P_{ES,R,max}^{i}$ | Min/max power for regulation power capacity | MW | $(-\infty, 0]$, $[0, \infty)$ | C |
| $SOC_{ES,min}^{i}$, $SOC_{ES,max}^{i}$ | Min/max state of charge (SOC) at the beginning of the time slot | — | $[0, 1]$ | C |
| $SOC_{ES}^{i,start}$ | Initial SOC at the beginning of scheduling in the CO/MPC engine 16, 18 | — | $[0, 1]$ | C |
| $SOC_{ES,min}^{i,end}$, $SOC_{ES,max}^{i,end}$ | Predefined min/max of SOC at the end of scheduling in the CO engine 16 | — | $[0, 1]$ | C |
| $\beta_{ES}^{i}$ | Self-discharge loss | — | $[0, 1]$ | C |
| $c_{ES,d/c}$ | Cost coefficient for BESS penalty function in the RPC engine 20 | \$/MW | $(0, \infty)$ | C |

A list of BESS variables used in the mathematical modelling is shown in Table 7 below:

TABLE 7

| Symbol | Description | Unit | Range | Type |
|---|---|---|---|---|
| Time-series | | | | |
| $P_{ES,E}^{i,t}$ | Net charging and discharging power for energy scheduling | MW | $(-\infty, \infty)$ | C |
| $P_{ES,E,d}^{i,t}$ | Discharging power for energy scheduling | MW | $[0, \infty)$ | C |
| $P_{ES,E,c}^{i,t}$ | Charging power for energy scheduling | MW | $(-\infty, 0]$ | C |
| $P_{ES,d}^{i,t}$ | Net discharging power in the RPC engine 20 | MW | $[0, \infty)$ | C |
| $P_{ES,c}^{i,t}$ | Net charging power in the RPC engine 20 | MW | $(-\infty, 0]$ | C |
| $P_{ES}^{i,t}$ | Net charging and discharging power in the RPC engine 20 | MW | $(-\infty, \infty)$ | C |
| $P_{ES,R}^{i,t}$ | Regulation power capacity | MW | $[0, \infty)$ | C |
| $P_{ES,R,d}^{i,t}$ | Discharging power for frequency regulation in the RPC engine 20 | MW | $[0, \infty)$ | C |
| $P_{ES,R,c}^{i,t}$ | Charging power for frequency regulation in the RPC engine 20 | MW | $(-\infty, 0]$ | C |
| $SCO_{ES}^{i,t}$ | SOC at the beginning of time slot t | — | $[0, 1]$ | C |
| $u_{ES}^{i,t}$ | Discharging/charging status for energy scheduling, 1: discharging, 0: charging | — | $\{0, 1\}$ | B |
| $\xi_{ES,E}^{i,t}$ | Operational mode indicator for energy scheduling, 1: activated, 0: not activated | — | $\{0, 1\}$ | B |
| $\xi_{ES,R}^{i,t}$ | Operational mode indicator for frequency regulation, 1: activated, 0: not activated | — | $\{0, 1\}$ | B |
| $y_{ES,1}^{i,t}$ | Auxiliary variable to linearize cost of deviation from the CO engine 16 charging/discharging power references (only in the MPC engine 18 Mode II) | — | $[0, \infty)$ | C |
| $y_{ES,2}^{i,t}$ | Auxiliary variable to linearize cost of deviation from the MPC engine 18 charging/discharging power references in the RPC engine 20 | — | $[0, \infty)$ | C |

A list of curtailable photovoltaics (CPV) parameters used in the mathematical modelling is shown in Table 8 below:

TABLE 8

| Symbol | Description | Unit | Range | Type |
|---|---|---|---|---|
| Time-series | | | | |
| $P_{CPV,max}^{i,t}$ | Max power forecast | MW | $[0, \infty)$ | C |
| Static | | | | |
| $\epsilon_{CPV,min}^{i}$, $\epsilon_{CPV,max}^{i}$ | Min/max curtailment coefficients | — | $[0, 1]$ | C |
| $C_{PV-inv,min}^{i}$ | Min power of CPV inverter | MW | $[0, \infty)$ | C |
| $C_{PV-inv,max}^{i}$ | Max power of CPV inverter | MW | $[0, \infty)$ | C |
| $c_{CPV}^{i}$ | Cost coefficient for CPV power curtailment in the CO engine 16 | \$/MWh | $(0, \infty)$ | C |
| $c_{CPV,pen-MPC}^{i}$ | Cost coefficient for CPV penalty function in the MPC engine 18 | \$/MWh | $(0, \infty)$ | C |
| $c_{CPV,pen-RPC}$ | Cost coefficient for CPV penalty function in the RPC engine 20 | \$/MWh | $(0, \infty)$ | C |

A list of curtailable photovoltaics (CPV) variables used in the mathematical modelling is shown in Table 9 below:

TABLE 9

| Symbol | Description | Unit | Range | Type |
|---|---|---|---|---|
| Time-series | | | | |
| $P_{CPV}^{i,t}$ | Scheduled power | MW | $[0, \infty)$ | C |
| $P_{CPV, cur}^{i,t}$ | Curtailed power | MW | $[0, \infty)$ | C |
| $u_{CPV}^{i,t}$ | Curtailment status, 1: on, 0: off | — | $\{0, 1\}$ | B |

A list of curtailable load (CL) parameters used in the mathematical modelling is shown in Table 10 below:

TABLE 10

| Symbol | Description | Unit | Range | Type |
|---|---|---|---|---|
| Time-series | | | | |
| $P_{CL, max}^{i,t}$ | Max power to be curtailed | MW | $[0, \infty)$ | C |
| Static | | | | |
| $c_{CL}^{i}$ | Curtailment cost | \$/MWh | $[0, \infty)$ | C |
| $\epsilon_{CL, min}^{i}$, $\epsilon_{CL, max}^{i}$ | Min/max curtailment coefficients | — | $[0, 1]$ | C |

A list of curtailable load (CL) variables used in the mathematical modelling is shown in Table 11 below:

TABLE 11

| Symbol | Description | Unit | Range | Type |
|---|---|---|---|---|
| Time-series | | | | |
| $P_{CL}^{i,t}$ | Scheduled power | MW | $[0, \infty)$ | C |
| $P_{CL, cur}^{i,t}$ | Curtailed power | MW | $[0, \infty)$ | C |
| $u_{CL}^{i,t}$ | Curtailment status, 1: on, 0: off | — | $\{0, 1\}$ | B |

A list of gas turbine (GT) parameters used in the mathematical modelling is shown in Table 12 below:

TABLE 12

| Symbol | Description | Unit | Range | Type |
|---|---|---|---|---|
| Time-series | | | | |
| $P_{GT, CO}^{i,t}$ | Interpolated power references sent from the CO engine 16 to MPC engine 18 (only in Mode II of the MPC engine 18) | MW | $[0, \infty)$ | C |
| $P_{GT, MPC}^{i,t}$ | Interpolated power references sent from the MPC engine 18 to the RPC engine 20 | MW | $[0, \infty)$ | C |
| Static | | | | |
| $P_{GT, G}^{i}$ | Power segment set of operating cost as a convex piecewise linear function | MW | $[0, \infty)$ | C |
| $C_{GT, G}^{i}$ | Cost segment set of operating cost as a convex piecewise linear function | \$/h | $[0, \infty)$ | C |
| $c_{GT, SU}^{i}$ | Startup cost | \$ | $[0, \infty)$ | C |
| $c_{GT, ref}^{i}$ | Cost coefficient of deviation from power references (only in Mode II of the MPC engine 18 and the RPC engine 20) | \$/MW | $[0, \infty)$ | C |
| $P_{GT, min}^{i}$, $P_{GT, max}^{i}$ | Min/max generation power | MW | $[0, \infty)$ | C |
| $P_{GT, up}^{i}$, $P_{GT, down}^{i}$ | Ramp-up/ramp-down limit | MW/h | $[0, \infty)$ | C |
| $P_{GT}^{i, 0}$ | Generation power at the beginning | MW | $[0, \infty)$ | C |
| $u_{GT}^{i, 0}$ | Activation status at the beginning, 1: on, 0: off (only in the CO engine 16 and Mode I of the MPC engine 18) | — | $\{0, 1\}$ | B |
| $T_{GT, on}^{i, 0}$, $T_{GT, off}^{i, 0}$ | Number of time slots that activation has been on/off at the beginning (only in the CO engine 16 and Mode I of the MPC engine 18) | — | $[0, \infty)$ | I |

TABLE 12-continued

| Symbol | Description | Unit | Range | Type |
|---|---|---|---|---|
| $T_{GT, on, min}^{i}$ | Min activation "on" time duration (only in the CO engine 16 and Mode I of the MPC engine 18) | — | [0, ∞) | I |
| $T_{GT, off, min}^{i}$ | Min activation "off" time durations (only in the CO engine 16 and Mode I of the MPC engine 18) | — | [0, ∞) | I |
| $L_{GT, G}^{i}$ | Index set of segments of GT operating cost | — | (0, ∞) | I |

A list of gas turbine (GT) variables used in the mathematical modelling is shown in Table 13 below:

TABLE 13

| Symbol | Description | Unit | Range | Type |
|---|---|---|---|---|
| Time-series | | | | |
| $P_{GT}^{i, t}$ | Scheduled power | MW | [0, ∞) | C |
| $y_{GT, ref}^{i, t}$ | Auxiliary variable to linearize penalty cost for deviation from power references (only in Mode II of the MPC engine 18 and the RPC engine 20) | MW | [0, ∞) | C |
| $u_{GT}^{i, t}$ | Activation status, 1: on, 0: off (the CO engine 16 and Mode I of the MPC engine 18) | — | {0, 1} | B |
| $w_{GT, on}^{i, t}$, $w_{GT, off}^{i, t}$ | Startup/shutdown flag (the CO engine 16 and Mode I of the MPC engine 18), 1: activation is on/off in the current time slot while the activation status in the previous time slot is off/on, 0: otherwise | — | {0, 1} | B |
| $\phi_{GT, SU}^{i, t, l}$ | Auxiliary startup cost indicator when a step cost function is used (the CO engine 16 and Mode I of the MPC engine 18), 1: GT starts up after having been off within hours $[T_{GT, SU}^{i, l}, T_{GT, SU}^{i, l+1}]$ | — | {0, 1} | B |

The mathematical model and problem formulation of the CO engine 16 is next described. In the embodiment, the objective in the CO engine 16 is to minimize the total cost of the electrical power system, subject to constraints. The objective function for the problem formulation may be given by:

$$Q_{UG,E} + Q_{UG,unc} + \sum_{i \in ES}(Q_{ES,cyc}^{i} - Q_{ES,FR}^{i}) +$$
$$\sum_{i \in CPV} Q_{CPV,cur}^{i} + \sum_{i \in CL} Q_{CL,cur}^{i} + \sum_{i \in GT}(Q_{GT,G}^{i} + Q_{GT,SU}^{i}),$$

where the costs are listed in Table 14 below:

TABLE 14

| Symbol | Asset | Description |
|---|---|---|
| Cost | | |
| $Q_{UG, E}$ | UG | Energy procurement |
| $Q_{UG, unc}$ | UG | Uncontracted capacity cost |
| $Q_{GT, G}^{i}$ | GT | Operating cost |
| $Q_{GT, SU}^{i}$ | GT | Startup cost |
| $Q_{ES, cyc}^{i}$ | BESS | Cycling aging cost |
| $Q_{CPV, cur}^{i}$ | CPV | CPV curtailment cost |
| $Q_{CL, cur}^{i}$ | CL | CL curtailment cost |
| Revenue | | |
| $Q_{ES, FR}^{i}$ | BESS | Revenue of frequency regulation |

Each cost component along with system constraints in the CO engine 16 are further elaborated as follows:

The system constraints may, for example, include keeping the supply and the demand balanced all the time. The power balance constraint for the CO engine 16 may then be given by:

$$P_G^{t_u} = \sum_{i \in CL} P_{CL}^{i,t_u} - \left(\sum_{i \in GT} P_{GT}^{i,t_u} + \sum_{i \in CPV} P_{CPV}^{i,t_u} + \sum_{i \in ES} P_{ES,E}^{i,t_u}\right), \quad (1.1)$$
$$\forall t_u \in T_u$$

The power import from and the power export to the electric power grid incurs cost and generates revenue respectively for the electrical power system. The electrical energy procurement cost/revenue in the CO engine 16 may be defined as:

$$Q_{UG,E} = \sum_{t_u \in T_u} c_{G,E}^{t_u} P_G^{t_u} \Delta t_u \quad (1.2)$$

Uncontracted capacity cost occurs when the peak load exceeds a given contracted capacity limit. $P_{UG,unctr} \geq 0$ denotes the deviation of the peak load from the contracted capacity limit and may be defined below as constraints. The uncontracted capacity cost for the CO engine 16 may be given by:

$$Q_{UG,unc} = c_{UG,unctr} P_{UG,unctr} \quad (1.3)$$

The import power from and export power to the grid may be within given minimum and maximum limits as follows:

$$P_{G,min} \leq P_G^{t_u} \leq P_{G,max}, \forall t_u \in T_u \quad (1.4)$$

The peak load is computed based on the market rules and regulation. For example, it may be derived by taking the maximum of the total load value (sum of the magnitude of true load, the BESS charging power and the regulation power capacity), as follows:

$$P_{UG,peak} = \max_{t_u \in T_u}\left(\sum_{i \in CL} P_{CL}^{i,t_u} - \sum_{i \in ES} P_{ES,R}^{i,t_u} - \sum_{i \in ES} P_{ES,E,c}^{i,t_u}\right) \quad (1.5)$$

The uncontracted capacity charge occurs once the peak load exceeds the given contracted capacity limit. Derivation of uncontracted load capacity from the uncontracted capacity limit may be given by:

$$P_{UG,unctr} = \max\{0, P_{UG,peak} - P_{UG,ctr}\} \quad (1.6)$$

For each of the BESS in the set of BESSs, i.e., $\forall i \in ES$: The cycling aging cost for the BESS may be given by:

$$Q_{ES,cyc}^i = c_{ES,cyc}^i \sum_{t_u \in T_u}\left(\frac{P_{ES,d}^{i,t_u}}{\eta_{ES,d}^i} - \eta_{ES,c}^i P_{ES,c}^{i,t_u}\right)\Delta t_u \quad (1.7)$$

And the revenue of frequency regulation for the BESS may be given by:

$$Q_{ES,FR}^i = \sum_{t_u \in T_u} c_{G,R}^{t_u} P_{ES,R}^{i,t_u} \Delta t_u \quad (1.8)$$

With regard to the operational mode constraints, the BESS may be modeled to be used for either energy scheduling or frequency regulation service applications, as follows:

$$\xi_{ES,E}^{i,t_u} + \xi_{ES,R}^{i,t_u} = 1, \forall t_u \in T_u \quad (1.9)$$

It is to be noted that $\xi_{ES,E}^{i,t_u}=1$ and $\xi_{ES,R}^{i,t_u}=0$ indicates that the BESS is providing energy scheduling while $\xi_{ES,E}^{i,t_u}=0$ and $\xi_{ES,R}^{i,t_u}=1$ indicates that the BESS is providing frequency regulation service for the electrical power system.

Charging/discharging power constraints may also ensure that the BESS meets the practical given power limits and also realizes the mode of operation.

$$0 \le P_{ES,E,d}^{i,t_u} \le u_{ES}^{i,t_u} P_{ES,max}^i, \forall t_u \in T_u \quad (1.10)$$

$$0 \ge P_{ES,E,c}^{i,t_u} \ge (1-u_{ES}^{i,t_u})P_{ES,min}^i, \forall t_u \in T_u \quad (1.11)$$

$$0 \le P_{ES,E,d}^{i,t_u} \le \xi_{ES,E}^{i,t_u} P_{ES,max}^i, \forall t_u \in T_u \quad (1.12)$$

$$0 \ge P_{ES,E,c}^{i,t_u} \ge \xi_{ES,E}^{i,t_u} P_{ES,min}^i, \forall t_u \in T_u \quad (1.13)$$

The net power output of the BESS may be given by:

$$P_{ES,E}^{i,t_u} = P_{ES,E,d}^{i,t_u} + P_{ES,E,c}^{i,t_u}, \forall t_u \in T_u \quad (1.14)$$

The BESS power capacity to be bid in a frequency regulation market may be optimized. The BESS provides symmetric power for both under and over frequency conditions. The BESS is thus subjected to the following constraints:

$$0 \le P_{ES,R}^{i,t_u} \le P_{ES,R,max}^{i,t_u} \xi_{ES,R}^{i,t_u}, \forall t_u \in T_u \quad (1.15)$$

$$-P_{ES,R}^{i,t_u} \ge P_{ES,R,min}^{i} \xi_{ES,R}^{i,t_u}, \forall t_u \in T_u \quad (1.16)$$

$$P_{ES,E}^{i,t_u} + P_{ES,R}^{i,t_u} \le \xi_{ES,max}^{i,t_u}, \forall t_u \in T_u \quad (1.17)$$

$$P_{ES,E}^{i,t_u} - P_{ES,R}^{i,t_u} \ge \xi_{ES,min}^{i}, \forall t_u \in T_u \quad (1.18)$$

The BESS has a finite capacity and cannot be discharged more than a given energy level. The following constraints ensure that the state of the charge (SOC) of the BESS remains within the practical energy limits:

$$SOC_{ES}^{i,t_u+1} = \beta_{ES}^i SOC_{ES}^{i,t_u} - \frac{\Delta t_u\left(\frac{P_{ES,E,d}^{i,t_u}}{\eta_{ES,d}^i} + P_{ES,E,c}^{i,t_u}\eta_{ES,c}^i\right)}{CAP_{ES}^i}, \forall t_u \in T_u \quad (1.19)$$

$$\min(SOC_{ES,min}^i, SOC_{ES}^{i,start}) + \frac{\alpha_{ES}^{i,t_u} P_{ES,R}^{i,t_u}\Delta t_u}{\eta_{ES,d}^i CAP_{ES}^i} \le SOC_{ES}^{i,t_u+1} \le \quad (1.20)$$

$$\max(SOC_{ES,max}^i, SOC_{ES}^{i,start}) - \frac{(\alpha_{ES}^{i,t_u}\eta_{ES,c}^i P_{ES,R}^{i,t_u}\Delta t_u)}{CAP_{ES}^i}, \forall t_u \in T_u$$

Prior to running the CO engine 16, the actual SOC value may be measured. The initial energy at the BESS at the beginning of scheduling may be given by $$SOC_{ES}^{i,1} = SOC_{ES}^{i,start} \quad (1.21)$$

The BESS may be required to reach a given SOC level by the end of the CO engine's scheduling, as $$SOC_{ES,min}^{i,end} \le SOC_{ES}^{i,T_u+1} \le SOC_{ES,max}^{i,end} \quad (1.22)$$

The CPV can curtail power, if required. Once $u_{CPV}^{i,t_u}=0$, the CPV acts as a fixed PV where its power generation cannot be controlled and optimized. For each of the CPV in the set of CPVs, i.e., for $\forall i \in CPV$:

The curtailment cost associated with the CPV may be given by:

$$Q_{CPV,cur}^i = c_{CPV}^i \sum_{t_u \in T_u} P_{CPV,cur}^{i,t_u} \Delta t_u \quad (1.23)$$

The power generated by the CPV may be within given minimum and maximum levels, specified by curtailment coefficients and CPV inverter limits as follows:

$$P_{CPV}^{i,t_u} \le u_{CPV}^{i,t_u}\min\left(\epsilon_{CPV,max}^i P_{CPV,max}^{i,t_u}, P_{CPV-inv,max}^{i,t_u}\right) + \quad (1.24)$$

$$(1-u_{CPV}^{i,t_u})\min(P_{CPV,max}^{i,t_u}, P_{CPV-inv,max}^i), \forall t_u \in T_u$$

$$P_{CPV}^{i,t_u} \ge u_{CPV}^{i,t_u}\max\left(\epsilon_{CPV,min}^i P_{CPV,max}^{i,t_u}, P_{CPV-inv,min}^{i,t_u}\right) + \quad (1.25)$$

$$(1-u_{CPV}^{i,t_u})\min(P_{CPV,max}^{i,t_u}, P_{CPV-inv,max}^i), \forall t_u \in T_u$$

The curtailed power by the CPV may then be derived as:

$$P_{CPV,cur}^{i,t_u} = \min(P_{CPV,max}^{i,t_u}, P_{CPV-inv,max}^i) - P_{CPV}^{i,t_u}, \forall t_u \in T_u \quad (1.26)$$

The curtailable load (CL) may be a general model for the load. The model allows for load power curtailment. Once $u_{CL}^{i,t_u}=0$, the CL acts as fixed load, where its power consumption cannot be controlled and optimized. For each CL in the set of CLs, i.e. $\forall i \in CL$:

There is a curtailment cost associated with the curtailed power by the CL that may be defined as follows:

$$Q_{CL,cur}^i = c_{CL}^i \sum_{t_u \in T_u} P_{CL,cur}^{i,t_u} \Delta t_u \quad (1.27)$$

The constraints for the CL may be mathematically modelled as follows:

$$u_{CL}^{i,t_u} \epsilon_{CL,min}^i P_{CL,max}^{i,t_u} + (1 - u_{CL}^{i,t_u}) P_{CL,max}^{i,t_u} \leq P_{CL}^{i,t_u} \leq \quad (1.28)$$

$$u_{CL}^{i,t_u} \epsilon_{CL,max}^i P_{CL,max}^{i,t_u} + (1 - u_{CL}^{i,t_u}) P_{CL,max}^{i,t_u}, \forall t_u \in T_u$$

The curtailed load power by CL may then be derived as follows:

$$P_{CL,cur}^{i,t_u} = P_{CL,max}^{i,t_u} - P_{CL}^{i,t_u}, \forall t_u \in T_u \quad (1.29)$$

The gas turbine's (GT's) operating cost may be mathematically modeled as a convex piecewise linear function, as a summation across the CO engine's scheduling horizon:

$$Q_{GT,G}^i = \sum_{t_u \in T_u} Q_{GT,G}^{i,t_u} \quad (1.30)$$

The operating cost in each interval t, $Q_{GT,G}^{i,t_u}$, is modeled as a convex piece-wise linear function with parameter segment sets of $P_{GT,G}^i$ and $C_{GT,G}^i$. With the index set $L_{GT,G}^i$ denoting the segment sets of the convex piecewise linear function and l denoting the segment index, the operating cost may be formulated using a set of linear inequalities as follows:

$$Q_{GT,G}^{i,t_u} \geq \left( \frac{C_{GT,G}^{i,l} - C_{GT,G}^{i,l-1}}{P_{GT,G}^{i,l} - P_{GT,G}^{i,l-1}} (P_{GT}^{i,t_u} - P_{GT,G}^{i,l}) + C_{GT,G}^{i,l} \right) \Delta t_u, \forall l \quad (1.31)$$

$$\in [2, L_{GT,G}^i], \forall t_u \in T_u$$

The cost associated with the GT's startup may be given by:

$$Q_{GT,SU}^i = c_{GT,SU}^i \sum_{t_u \in T_u} w_{GT,on}^{i,t_u} \quad (1.32)$$

The GT's power may be within given minimum and maximum power limits, as follows:

$$u_{GT}^{i,t_u} P_{GT,min}^{i,t_u} \leq P_{GT}^{i,t_u} \leq u_{GT}^{i,t_u} P_{GT,max}^{i,t_u}, \forall t_u \in T_u \quad (1.33)$$

The GT cannot increase or decrease its power instantly. There are ramp up and down limits for its power change, defined through the following constraints:

$$P_{GT}^{i,t_u} - P_{GT}^{i,t_u-1} \leq \Delta t_u R_{GT,up}^i, \forall t_u \in T_u \quad 1.34$$

$$P_{GT}^{i,t_u-1} - P_{GT}^{i,t_u} \leq \Delta t_u R_{GT,down}^i, \forall t_u \in T_u \quad 1.35$$

Once a GT is turned on, it must remain on for a minimum duration of time. First, a binary decision variable for the continuous "on" operation of GT may be defined as follows:

$$w_{GT,on}^{i,t_u} \geq u_{GT}^{i,t_u} - u_{GT}^{i,t_u-1}, \forall t_u \in T_u \quad (1.36)$$

$$w_{GT,on}^{i,t_u} \leq 1 - u_{GT}^{i,t_u-1}, \forall t_u \in T_u \quad (1.37)$$

$$w_{GT,on}^{i,t_u} \leq u_{GT}^{i,t_u}, \forall t_u \in T_u \quad (1.38)$$

The limit on minimum "on" activation time duration may then be given by:

$$\sum_{s=t_u}^{t_u+T_{GT,on,min}^i - T_{GT,on}^{i,0} - 1} u_{GT}^{i,s} \geq \quad (1.39)$$

$$u_{GT}^{i,0}(T_{GT,on,min}^i - T_{GT,on}^{i,0}) + T_{GT,on,min}^i w_{GT,on}^{i,t_u},$$

$$t_u = 1 \text{ and } T_{GT,on,min}^i > T_{GT,on}^{i,0}$$

$$\sum_{s=t_u}^{t_u+T_{GT,on,min}^i - 1} u_{GT}^{i,s} \geq T_{GT,on,min}^i w_{GT,on}^{i,t_u}, \quad (1.40)$$

$$\forall t_u \in [2, T_u - T_{GT,on,min}^i + 1]$$

Similarly, once the GT is off, it must remain off for a minimum duration of time. First, a binary decision variable for the continuous "off" operation of GT may be defined as follows:

$$w_{GT,off}^{i,u,t_u} \geq u_{GT}^{i,t_u-1} - u_{GT}^{i,t_u}, \forall t_u \in T_u \quad (1.41)$$

$$w_{GT,off}^{i,t_u} \leq u_{GT}^{i,t_u-1}, \forall t_u \in T_u \quad (1.42)$$

$$w_{GT,off}^{i,t_u} \leq 1 - u_{GT}^{i,t_u}, \forall t_u \in T_u \quad (1.43)$$

The limit on minimum "off" activation time duration may then be given by:

$$\sum_{s=t_u}^{t_u+T_{GT,off,min}^i - T_{GT,off}^{i,0} - 1} (1 - u_{GT}^{i,s}) \geq \quad (1.44)$$

$$(1 - u_{GT}^{i,0})(T_{GT,off,min}^i - T_{GT,off}^{i,0}) + T_{GT,off,min}^i w_{GT,off}^{i,t_u},$$

$$t_u = 1 \text{ and if } T_{GT,off,min}^i > T_{GT,off}^{i,0}$$

$$\sum_{s=t_u}^{t_u+T_{GT,off,min}^i - 1} (1 - u_{GT}^{i,s}) \geq T_{GT,off,min}^i w_{GT,off}^{i,t_u}, \quad (1.45)$$

$$\forall t_u \in [2, T_u - T_{GT,off,min}^i + 1]$$

The mathematical model and problem formulation of the MPC engine 18 is next described. As described above, the MPC engine 18 supports two operational modes, Mode I and Mode II. In Mode I, the MPC engine 18 operates independently from the CO engine 16 in the cloud and is thus more robust against failures, such as failure of the CO engine 16 in the cloud, loss of communication between the cloud and the edge, etc. Hence, the MPC engine 18 in this mode needs to consider all the DERs modeling along with their costs and constraints to solve a comprehensive optimization problem.

However, in Mode II the MPC engine 18 relies on receiving data from the CO engine 16 in cloud to operate. Specifically, a more comprehensive optimization problem is solved in the CO engine 16 and some results including operational modes of the BESSs, regulation power capacities of BESS, etc., are communicated to the MPC engine 18 in edge. Consequently, the MPC engine 18 operating in Mode II needs to comply with setpoints received from the CO engine 16. Under Mode II operation, there are additional cost functions compared to Mode I operation, including cost of deviation from the CO engine's charging/discharging power references. However, unlike Mode I, regulation revenue does not appear among cost functions in Mode II, since the values are respected from the CO engine 16.

The objective function for the problem formulation under Mode I operation may be given by:

$$Q_{UG,E} + Q_{UG,unc} + \sum_{i \in ES}(Q^i_{ES,cyc} - Q^i_{ES,FR}) + \sum_{i \in CPV} Q^i_{CPV,pen} + \sum_{i \in CL} Q^i_{CL,cur} + \sum_{i \in GT}(Q^i_{GT,G} + Q^i_{GT,SU})$$

The objective function for the problem formulation under Mode II operation may be given by:

$$Q_{UG,E} + Q_{UG,unc} + \sum_{i \in ES}(Q^i_{ES,cyc} + Q^i_{ES,dev}) + \sum_{i \in CPV} Q^i_{CPV,pen} + \sum_{i \in CL} Q^i_{CL,cur} + \sum_{i \in GT}(Q^i_{GT,G} + Q^i_{GT,ref}),$$

where the costs are listed in Table 15 below:

TABLE 15

| Cost/Revenue | Asset | Description |
|---|---|---|
| $Q_{UG,E}$ | Grid | Energy procurement cost |
| $Q_{UG,unc}$ | Grid | Uncontracted capacity cost |
| $Q^i_{CPV,pen}$ | CPV | CPV penalty cost |
| $Q^i_{CL,cur}$ | CL | CL curtailment cost |
| $Q^i_{ES,cyc}$ | BESS | Cycling aging cost |
| $Q^i_{ES,FR}$ (only in Mode I) | BESS | BESS regulation capacity revenue |
| $Q^i_{ES,dev}$ (only in Mode II) | BESS | Cost of deviation from CO engine charging/discharging power references |
| $Q^i_{GT,G}$ | GT | Operating cost |
| $Q^i_{GT,SU}$ (only in Mode I) | GT | Startup cost |
| $Q^i_{GT,ref}$ (only in Mode II) | GT | Cost of deviation from CO engine power references |

Each component is further elaborated as follows:

The power balance constraint for the MPC engine 18 may be given by:

$$P^t_G = \sum_{i \in CL} P^{i,t}_{CL} - \left(\sum_{i \in GT} P^{i,t}_{GT} + \sum_{i \in CPV} P^{i,t}_{CPV} + \sum_{i \in ES} P^{i,t}_{ES,E}\right), \quad (2.1)$$
$$\forall t \in T$$

The electrical energy procurement cost/revenue for the MPC engine 18 is defined as:

$$Q_{UG,E} = \sum_{t \in T} c^t_{G,E} P^t_G \Delta t \qquad (2.2)$$

The uncontracted capacity cost for the MPC engine 18 may be given by:

$$Q_{UG,unc} = c_{UG,unctr} P_{UG,unctr} \qquad (2.3)$$

The import power from and the export power to the grid may be within given minimum and maximum limits as follows:

$$P_{G,min} \leq P^t_G \leq P_{G,max}, \forall t \in T \qquad (2.4)$$

The peak load is computed based on the market rules and regulation. For example, it may be derived by taking the maximum of total load value (sum of the magnitude of true load, the BESS charging power and the regulation power capacity), as follows:

$$P_{UG,peak} = \max_{t \in T}\left(\sum_{i \in CL} P^{i,t}_{CL} - \sum_{i \in ES} P^{i,t}_{ES,R} - \sum_{i \in ES} P^{i,t}_{ES,E,c}\right) \qquad (2.5)$$

Derivation of peak load from the uncontracted capacity limit is given by:

$$P_{UG,unctr} = \max\{0, P_{UG,peak} - P_{UG,ctr}\} \qquad (2.6)$$

For each of the BESS in the set of BESSs, i.e., $\forall i \in ES$:
The cycling aging cost for the BESS may be given by:

$$Q^i_{ES,cyc} = c^i_{ES,cyc} \sum_{t \in T}\left(\frac{P^{i,t}_{ES,d}}{\eta^i_{ES,d}} - \eta^i_{ES,c} P^{i,t}_{ES,c}\right)\Delta t \qquad (2.7)$$

And the revenue of frequency regulation for the BESS may be given by (only in Mode I):

$$Q^i_{ES,FR} = \sum_{t \in T} c^t_{G,R} P^{i,t}_{ES,R} \Delta t \qquad (2.8)$$

Deviation from charging and discharging power references sent from the CO engine 16 is as follows (only in Mode II):

$$Q^i_{ES,dev} = c^i_{ES,CO} \sum_{t \in T}\left(|P^{i,t}_{ES,E} - (P^{i,t}_{ES,CO,d} + P^{i,t}_{ES,CO,c})|\right) \qquad (2.9)$$

The cost function $Q_{ES,dev}^i$ is non-linear. To linearize the problem, we replace the above cost with the following cost function, with additional constraints added to the constraints section below (only in Mode II):

$$Q^i_{ES,dev} = c^i_{ES,CO} \sum_{t \in T} y^{i,t}_{ES,1} \qquad (2.10)$$

Operational mode constraints (only in Mode I): The BESS is modeled to be used for either energy scheduling or frequency regulation service applications, as follows:

$$\xi^{i,t}_{ES,E} + \xi^{i,t}_{ES,R} = 1, \forall t \in T \qquad (2.11)$$

It is to be noted that $\xi_{ES,E}^{i,t}=1$ indicates that the BESS is providing energy scheduling only while $\xi_{ES,E}^{i,t}=1$ indicates that it provides frequency regulation service only for the system.

Charging/discharging power constraints ensure that the BESS meets the practical given power limits and also realizes the mode of operation.

$$0 \leq P^{i,t}_{ES,E,d} \leq u^{i,t}_{ES} P^i_{ES,max}, \forall t \in T \qquad (2.12)$$

$$0 \geq P^{i,t}_{ES,E,c} \geq (1 - u^{i,t}_{ES}) P^i_{ES,min}, \forall t \in T \qquad (2.13)$$

$$0 \leq P^{i,t}_{ES,E,d} \leq \xi^{i,t}_{ES,E} P^i_{ES,max}, \forall t \in T \qquad (2.14)$$

$$0 \geq P^{i,t}_{ES,E,c} \geq \xi^{i,t}_{ES,E} P^i_{ES,min}, \forall t \in T \qquad (2.15)$$

The net power output of the BESS is given by:

$$P^{i,t}_{ES,E} = P^{i,t}_{ES,E,d} + P^{i,t}_{ES,E,c}, \forall t \in T \qquad (2.16)$$

The BESS power capacity to be bid in a frequency regulation market can be optimized. BESS provides symmetric power for both under and over frequency conditions. The BESS are thus subjected to the following constraints (only in Mode I):

$$0 \leq P^{i,t}_{ES,R} \leq P^i_{ES,R,max} \xi^{i,t}_{ES,R}, \forall t \in T \qquad (2.17)$$

$$-P^{i,t}_{ES,R} \geq P^i_{ES,R,min} \xi^{i,t}_{ES,R}, \forall t \in T \qquad (2.18)$$

$$P^{i,t}_{ES,E} + P^{i,t}_{ES,R} \leq P^i_{ES,max}, \forall t \in T \qquad (2.19)$$

$$P^{i,t}_{ES,E} - P^{i,t}_{ES,R} \geq P^i_{ES,min}, \forall t \in T \qquad (2.20)$$

Additional constraints for linearization of the cost function $Q_{ES,dev}^i$ (only in Mode II):

$$y^{i,t}_{ES,1} \geq (P^{i,t}_{ES,E} - P^{i,t}_{ES,CO,d} - P^{i,t}_{ES,CO,c}), \forall t \in T \qquad (2.21)$$
$$y^{i,t}_{ES,1} \geq -(P^{i,t}_{ES,E} - P^{i,t}_{ES,CO,d} - P^{i,t}_{ES,CO,c}), \forall t \in T$$

The BESS has a finite capacity and cannot be discharged more than a given energy level. The following constraints ensure that the state of the charge (SOC) of the BESS remains within the practical energy limits:

$$SOC^{i,t+1}_{ES} = \beta^i_{ES} SOC^{i,t}_{ES} - \Delta t (P^{i,t}_{ES,E,d}/\eta^i_{ES,d} + P^{i,t}_{ES,E,c} \eta^i_{ES,c})/CAP^i_{ES}, \qquad (2.22)$$
$$\forall t \in T$$

The MPC engine 18 in Mode I:

$$SOC^{i,t+1}_{ES} \leq \max(SOC^{i,start}_{ES}, SOC^i_{ES,max}) - (\eta^i_{ES,c} P^{i,t}_{ES,R} \Delta t)/CAP^i_{ES}, \qquad (2.23)$$
$$\forall t \in T$$

$$SOC^{i,t+1}_{ES} \geq \min(SOC^{i,start}_{ES}, SOC^i_{ES,min}) + \left(\frac{P^{i,t}_{ES,R}}{\eta^i_{ES,d}} \Delta t\right)/CAP^i_{ES}, \forall t \in T \qquad (2.24)$$

The MPC engine 18 in Mode II:

$$SOC^{i,t+1}_{ES} \leq \max(SOC^{i,start}_{ES}, SOC^i_{ES,max}), \forall t \in T \qquad (2.25)$$

$$SOC^{i,t+1}_{ES} \geq \min(SOC^{i,start}_{ES}, SOC^i_{ES,min}), \forall t \in T \qquad (2.26)$$

Prior to running the CO engine 16, the actual SOC value should be measured. The initial energy at BESS at the beginning of scheduling is given by $$SOC^{i,1}_{ES} = SOC^{i,start}_{ES} \qquad (2.27)$$

In Mode II, the CPV curtailment on/off status is already decided by the CO engine 16; thus, $u_{CPV}^{i,t}$ is a given value and not a decision variable.

For each of the CPV in the set of CPVs, i.e., for $\forall i \in CPV$:

A small penalty is imposed for curtailed power, thus reducing unnecessary curtailment of CPV in the MPC engine 18.

$$Q^i_{CPV,pen} = c^i_{CPV,pen-MPC} \sum_{t \in T} P^{i,t}_{CPV,cur} \Delta t \qquad (2.28)$$

The power generated by CPV may be within given minimum and maximum levels, specified by curtailment coefficients as well as CPV inverter limits as follows:

$$P^{i,t}_{CPV} \leq u^{i,t}_{CPV} \min(\epsilon^i_{CPV,max} P^{i,t}_{CPV,max}, P^i_{CPV-inv,max}) + \qquad (2.29)$$
$$(1 - u^{i,t}_{CPV}) \min(P^{i,t}_{CPV,max}, P^i_{CPV-inv,max}), \forall t \in T$$

$$P^{i,t}_{CPV} \geq u^{i,t}_{CPV} \max(\epsilon^i_{CPV,min} P^{i,t}_{CPV,max}, P^i_{CPV-inv,min}) + \qquad (2.30)$$
$$(1 - u^{i,t}_{CPV}) \min(P^{i,t}_{CPV,max}, P^i_{CPV-inv,max}), \forall t \in T$$

The curtailed power by CPV may then be derived as:

$$P^{it}_{CPV,cur} = \min(P^{i,t}_{CPV,max}, P^i_{CPV-inv,max}) - P^{i,t}_{CPV}, \forall t \in T \qquad (2.31)$$

In Mode II of the MPC engine 18, the CL curtailment on/off status is already decided by the CO engine 16; thus, $u_{CL}^{i,t}$ is a given value and not a decision variable.

For each of the CL in the set of CLs, i.e., $\forall i \in CL$:

There is a curtailment cost associated with the curtailed power by load, defined as:

$$Q_{CL,cur}^i = c_{CL}^i \sum_{t \in T} P_{CL,cur}^{i,t} \Delta t \qquad (2.32)$$

The power generated by CL may be within given minimum and maximum levels, specified with minimum and maximum curtailment coefficient:

$$u_{CL}^{i,t} \epsilon_{CL,min}^i P_{CL,max}^{i,t} + (1 - u_{CL}^{i,t}) P_{CL,max}^{i,t} \leq \qquad (2.33)$$
$$P_{CL}^{i,t} \leq u_{CL}^{i,t} \epsilon_{CL,max}^i P_{CL,max}^{i,t} + (1 - u_{CL}^{i,t}) P_{CL,max}^{i,t}, \forall t \in T$$

The curtailed load power by the CL may then be derived as:

$$P_{CL,cur}^{i,t} = P_{CL,max}^{i,t} - P_{CL}^{i,t}, \forall t \in T \qquad (2.34)$$

It is to be noted that $u_{GT}^{i,t}$ is not a decision variable in Mode II of the MPC engine 18. To determine $u_{GT}^{i,t}$, both results from the CO engine 16 as well as actual measured data from GT will be used.

The GT's operating cost may be mathematically modeled as a convex piecewise linear function, as a summation across the MPC engine's scheduling horizon:

$$Q_{GT,G}^i = \sum_{t \in T} Q_{GT,G}^{i,t} \qquad (2.35)$$

The operating cost in each interval t, $Q_{GT,G}^{i,t}$, is modeled as a convex piece-wise linear function with parameter segment sets of $P_{GT,G}^i$ and $C_{GT,G}^i$. With the index set $L_{GT,G}^i$ denoting the segment sets of the piecewise linear function and l denote the segment index, the operating cost may be formulated using a set of linear inequalities as follows:

$$Q_{GT,G}^{i,t} \geq \left( \frac{C_{GT,G}^{i,l} - C_{GT,G}^{i,l-1}}{P_{GT,G}^{i,l} - P_{GT,G}^{i,l-1}} (P_{GT}^{i,t} - P_{GT,G}^{i,l}) + C_{GT,G}^{i,l-1} \right) \Delta t, \qquad (2.36)$$
$$\forall l \in [2, L_{GT,G}^i], \forall t \in T$$

There is also a cost associated with GT's startup (only in Mode I of the MPC engine 18), given as follows:

$$Q_{GT,SU}^i = c_{GT,SU}^i \sum_{t \in T} w_{GT,on}^{i,t} \qquad (2.37)$$

Cost of deviation from power references provided by the CO engine 16 (only in Mode II of the MPC engine 18)

$$Q_{GT,ref}^i = c_{GT,ref}^i \sum_{t \in T} |P_{GT}^{i,t} - P_{GT,CO}^{i,t}| \qquad (2.38)$$

The cost function $Q_{CT,ref}^i$ is nonlinear. To linearize the problem, we replace the above cost with the following cost function (only in Mode II of the MPC engine 18). Additional constraints are added as will be described later.

$$Q_{GT,ref}^i = c_{GT,ref}^i \sum_{t \in T} y_{GT,ref}^{i,t} \qquad (2.39)$$

The GT's power may be within given minimum and maximum power limits, as follows:

$$u_{GT}^{i,t} P_{GT,min}^{i,t} \leq P_{GT}^{i,t} \leq u_{GT}^{i,t} P_{Gt,max}^{i,t} \forall t \in T \qquad (2.40)$$

The GT cannot increase or decrease its power instantly. There are ramp up and down limits for its power change, defined through the following constraints:

$$P_{GT}^{i,t} - P_{GT}^{i,t-1} \leq \Delta t R_{Gt,up}^i, \forall t \in T \qquad (2.41)$$

$$P_{GT}^{i,t-1} - P_{GT}^{i,t} \leq \Delta t R_{GT,down}^i, \forall t \in T \qquad (2.42)$$

Additional constraints for linearization of the cost function $Q_{CT,ref}^i$ (only in Mode II of the MPC engine 18):

$$y_{GT,ref}^{i,t} \geq (P_{GT}^{i,t} - P_{GT,CO}^{i,t}), \forall t \in T \qquad (2.43)$$

$$y_{GT,ref}^{i,t} \geq -(P_{GT}^{i,t} - P_{GT,CO}^{i,t}), \forall t \in T$$

The remaining constraints for GT are related to on and off duration of GT, which are all applicable in Mode I of the MPC engine 18 only.

Once GT is turned on, it must remain on for a minimum duration of time. First, a binary decision variable for the continuous on operation of GT is defined as follows:

$$w_{GT,on}^{i,t} \geq u_{GT}^{i,t} - u_{GT}^{i,t-1}, \forall t \in T \qquad (2.44)$$

$$w_{GT,on}^{i,t} \leq 1 - u_{GT}^{i,t-1}, \forall t \in T \qquad (2.45)$$

$$w_{GT,on}^{i,t} \leq u_{GT}^{i,t}, \forall t \in T \qquad (2.46)$$

The limit on minimum activation time duration is then given by:

$$\sum_{k=t}^{t+T_{GT,on,min}^i - T_{GT,on}^{i,0} - 1} u_{GT}^{i,s} \geq \qquad (2.47)$$
$$u_{GT}^{i,0} (T_{GT,on,min}^i - T_{GT,on}^{i,0}) + T_{GT,on,min}^i w_{GT,on}^{i,t},$$
$$t = 1 \text{ and if } T_{GT,on,min}^i > T_{GT,on}^{i,0}$$

$$\sum_{s=t}^{t+T_{GT,on,min}^i - 1} u_{GT}^{i,s} \geq T_{GT,on,min}^i w_{GT,on}^{i,t}, \forall t \in [2, T - T_{GT,on,min}^i + 1] \qquad (2.48)$$

Similarly, once the GT is off, it must remain off for a minimum duration of time. First, a binary decision variable for the continuous off operation of GT is defined as follows:

$$w_{GT,off}^{i,u,t} \geq u_{GT}^{i,t-1} - u_{GT}^{i,t}, \forall t \in T \quad (2.49)$$

$$w_{GT,off}^{i,t} \leq u_{GT}^{i,t-1}, \forall t \in T \quad (2.50)$$

$$w_{GT,off}^{i,t} \leq 1 - u_{GT}^{i,t}, \forall t \in T \quad (2.51)$$

The limit on minimum "off" activation time duration is then given by:

$$\sum_{s=t}^{t+T_{GT,off,min}^{i}-T_{GT,off}^{i,0}-1} \left(1 - u_{GT}^{i,s}\right) \geq \quad (2.52)$$

$$\left(1 - u_{GT}^{i,0}\right)\left(T_{GT,off,min}^{i} - T_{GT,off}^{i,0}\right) + T_{GT,off,min}^{i} w_{GT,off}^{i,t},$$

$$t = 1 \text{ and if } T_{GT,off,min}^{i} > T_{GT,off}^{i,0}$$

$$\sum_{s=t}^{t+T_{GT,off,min}^{i}-1} \left(1 - u_{GT}^{i,s}\right) \geq T_{GT,off,min}^{i} w_{GT,off}^{i,t}, \quad (2.53)$$

$$\forall t \in \left[2, T - T_{GT,off,min}^{i} + 1\right]$$

The mathematical model and problem formulation of the RPC engine 20 according to one embodiment is next described. As previously described, the RPC engine 20 is located in the edge and is able to respond to real-time energy and regulation signals in seconds and therefore able to provide real-time or almost real-time operation planning data, i.e., power setpoints, for the controllers of the DERs 4. This is due to the fact that RPC is formulated as a LP optimization problem, which results in a much faster optimal solution computation compared to the mixed integer linear programming (MILP) optimization problems in the CO engine 16 and the MPC engine 18.

The RPC engine 20 minimizes deviations of the two control signals: 1) grid operation signal and 2) frequency regulation signal. To follow grid operation signal, all the DERs (BESS, CPV, GT, and CL) are considered to be able to contribute. To follow frequency regulation signal, only BESS is considered to be able to follow the received signal from the grid.

The objective function for the problem formulation in the RPC engine 20 may be given by:

$$Q_{UG,E} + Q_{Dev} + \sum_{i \in ES}\left(Q_{ES,Dev}^{i} + Q_{ES,d/c}^{i}\right) +$$

$$\sum_{i \in CPV} Q_{CPV,pen}^{i} + \sum_{i \in CL} Q_{CL,cur}^{i} + \sum_{i \in GT}\left(Q_{GT,G}^{i} + Q_{GT,ref}^{i}\right),$$

where the costs are listed in the Table 16 below:

TABLE 16

| Cost/Revenue | Asset | Description |
|---|---|---|
| $Q_{UG,E}$ | Grid | Energy procurement cost |
| $Q_{Dev,Reg}$ | Grid | Cost of deviation from "frequency regulation" signal |
| $Q_{Dev,oper}$ | Grid | Cost of deviation from "grid operation" signal |
| $Q_{Dev}$ | Grid | Total deviation cost |
| $Q_{CPV,pen}^{i}$ | CPV | CPV penalty cost |

TABLE 16-continued

| Cost/Revenue | Asset | Description |
|---|---|---|
| $Q_{CL,cur}^{i}$ | CL | CL curtailment cost |
| $Q_{ES,Dev}^{i}$ | BESS | Cost of deviation from MPC engine charging/discharging power references |
| $Q_{ES,d/c}^{i}$ | BESS | BESS penalty cost |
| $Q_{ES,G}^{i}$ | GT | Operating cost |
| $Q_{ES,ref}^{i}$ | GT | Cost of deviation from the MPC engine 18 power references |

Each cost component is further elaborated as follows:

The power balance constraint for the RPC engine 20 may then be given by:

$$P_G^{t_l} = \sum_{i \in CL} P_{CL}^{i,t_l} - \left(\sum_{i \in GT} P_{GT}^{i,t_l} + \sum_{i \in CPV} P_{CPV}^{i,t_l} + \sum_{i \in ES} P_{ES}^{i,t_l}\right), \quad (3.1)$$

$$\forall t_l \in T_l$$

Total regulation power capacity of the system is provided by all the BESSs, as follows:

$$R_{tot}^{t_l} = \sum_{i \in ES} P_{ES,R}^{i,t_l}, \forall t_l \in T_l \quad (3.2)$$

The electrical energy procurement cost/revenue in the RPC engine 20 may be defined as:

$$Q_{UG,E} = \sum_{t_l \in T_l} c_{G,E}^{t_l} P_G^{t_l} \Delta t_l \quad (3.3)$$

The RPC engine 20 tries to follow grid signals as closely as possible. To do so, deviations from grid signals are penalized. Two grid signals are considered: grid operation signal and frequency regulation signal.

Grid operation signal indicates grid power setpoint orders to adjust the "net" power of the system, where $\lambda_{oper}^{t_l} \geq 0$ means the grid has power surplus and there is a need for DERs to use up the excess power (BESS to charge, CPV to reduce generation, CL to increase power consumption, and/or GT to reduce power generation). $\lambda_{oper}^{t_l} < 0$ means the grid has power deficit and there is a need for DERs to supply power (BESS to discharge, CPV to increase generation, CL to decrease power consumption, and/or GT to increase power generation). Any deviation from the received grid operation signal will be penalized:

$$Q_{Dev,oper} = c_{dev,oper} \sum_{t_l \in T_l} \left|\lambda_{oper}^{t_l} - P_G^{t_l}\right| \quad (3.4)$$

Frequency regulation signal refers to a high pass remote automatic generation control (AGC) signal, which is a measure of the imbalance between the supply and the demand in the grid. The BESS is considered as the only DER that can charge/discharge to respond to the frequency regulation signal. The normalized frequency regulation signal $\lambda_{Reg}^{t_l}$ indicates whether the system needs to transfer power to the grid or receive power from it. Particularly, $\lambda_{Reg}^{t_l} \geq 0$ indicates an under-frequency condition, where power should be exported to the grid (i.e., BESS to discharge), while $\lambda_{Reg}^{t_l} < 0$ indicates an over-frequency condition, where excess power should be imported to the system (i.e., BESS to charge).

The frequency regulation signal is sent to the system every few seconds (depending on the market). Regulation market then tracks the response of the electrical power system and evaluates the performance at the end of each service hour. Systems with poor performance may become ineligible to participate in the frequency regulation market in the future. As a result, the BESSs in the RPC engine 20 should follow the frequency regulation signal as closely as possible. With the total regulation power capacity of $R_{tot}^{t_l}$, the BESSs should follow the signal of:

$$\lambda_{Reg}^{t_l} = R_{tot}^{t_l} \lambda_R^{t_l} \tag{3.5}$$

The cost of not following the frequency regulation signal is given by:

$$Q_{Dev,Reg} = c_{dev,reg} \sum_{t_l \in T_l} \left| \lambda_{Reg}^{t_l} - \sum_{i \in ES} P_{ES}^{i,t_l} \right| \tag{3.6}$$

As a result, the total deviation cost comprises the above two costs:

$$Q_{Dev} = Q_{Dev,Reg} + Q_{Dev,oper} \tag{3.7}$$

The cost function $Q_{Dev}$ is non-linear. To linearize the problem, the above cost is replaced with the following cost function, with additional constraints added to the constraints which will be described later:

$$Q_{Dev} = \sum_{t_l \in T_l} \left( c_{dev,reg} y_{G,1}^{t_l} + c_{dev,opr} y_{G,2}^{t_l} \right) \tag{3.8}$$

The import power from and export power to the grid may be within given minimum and maximum limits as follows:

$$P_{G,min} \le P_G^{t_l} \le P_{G,max}, \forall t_l \in T_l \tag{3.9}$$

Additional constraints for linearization of the cost function $Q_{Dev}$:

$$y_{G,1}^{t_l} \ge \left( \lambda_{Reg}^{t_l} - \sum_{i \in ES} P_{ES}^{i,t_l} \right), \forall t_l \in T_l \tag{3.10}$$

$$y_{G,1}^{t_l} \ge -\left( \lambda_{Reg}^{t_l} - \sum_{i \in ES} P_{ES}^{i,t_l} \right), \forall t_l \in T_l$$

For each BESS in the set of BESSs, i.e., $\forall i \in ES$:
The cost of deviation from charging/discharging power references sent from the MPC engine 18 is given by:

$$Q_{ES,Dev}^i = c_{ES,MPC}^i \sum_{t_l \in T_l} \left( |P_{ES}^{i,t_l} - P_{ES,MPC,d}^{i,t_l} - P_{ES,MPC,c}^{i,t_l}| \right) \tag{3.11}$$

The cost function $Q_{ES,Dev}^i$ is non-linear. To linearize the problem, the above cost is replaced with the following cost function, with additional constraints that will be described below:

$$Q_{ES,Dev}^i = c_{ES,MPC}^i \sum_{t_l \in T_l} y_{ES,2}^{i,t_l} \tag{3.12}$$

Penalty cost penalizes unnecessary charging and discharging power of the BESS in RPC. It penalizes simultaneous charge and discharge in each BESS, simultaneous charging/discharging among different BESSs in the same mode. The BESS penalty cost is given as below:

$$Q_{ES,d/c}^i = c_{ES,d/c} \sum_{t_l \in T_1} \left( P_{ES,d}^{i,t_l} - P_{ES,c}^{i,t_l} \right) \tag{3.13}$$

Additional constraints for linearization of cost function $Q_{ES,Dev}^i$ are given by:

$$y_{ES,2}^{i,t_l} \ge \left( P_{ES}^{i,t_l} - P_{ES,MPC,d}^{i,t_l} - P_{ES,MPC,c}^{i,t_l} \right), \forall t_l \in T_l \tag{3.14}$$

$$y_{ES,2}^{i,t_l} \ge -\left( P_{ES}^{i,t_l} - P_{ES,MPC,d}^{i,t_l} - P_{ES,MPC,c}^{i,t_l} \right), \forall t_l \in T_1$$

Limit on charging and discharging power should not only consider the physical system charging/discharging rates, but the regulation power capacity and power limits imposed by the MPC engine 18 needs to be considered as well. New charging/discharging limits reflecting SOC limitations are given by:

$$P_{ES,RPC,min}^{i,t_l} = \max\{P_{ES,min}^i + R_{ES}^{i,t_l}, P_{ES,soc,min}^{i,t_l}\}, \forall t_l \in T_1 \tag{3.15}$$

$$P_{ES,RPC,max}^{i,t_l} = \min\{P_{ES,max}^i - R_{ES}^{i,t_l}, P_{ES,soc,max}^{i,t_l}\}, \forall t_l \in T_l \tag{3.16}$$

Given the above charging/discharging limits, the charging and discharging power related to "energy" should meet the following constraints:

$$0 \le P_{ES,E,d}^{i,t_l} \le \xi_{ES,E}^{i,t_l} P_{ES,RPC,max}^{i,t_l}, \forall t_l \in T_1 \tag{3.17}$$

$$0 \ge P_{ES,E,c}^{i,t_l} \ge \xi_{ES,E}^{i,t_l} P_{ES,RPC,min}^{i,t_l}, \forall t_l \in T_1$$

BESSs with enabled frequency regulation ($\xi_{ES,E}^{i,t}=1$) can respond to meet the frequency regulation signal, based on their regulation power capacities and the computed charging/discharging rates reflecting SOC limitations in the MPC engine 18, as follows:

$$P_{ES,R,max}^{i,t_l} = \begin{cases} \min\{P_{ES,R}^{i,t_l}, P_{ES,soc,max}^{i,t_l}\}, & P_{ES,soc,min}^{i,t_l} < -P_{ES,R}^{i,t_l} \\ P_{ES,max}^{i,t_l}, & P_{ES,soc,min}^{i,t_l} \ge -P_{ES,R}^{i,t_l} \end{cases} \tag{3.18}$$

$$P_{ES,R,min}^{i,t_l} = \begin{cases} -\min\{P_{ES,R}^{i,t_l}, P_{ES,soc,min}^{i,t_l}\}, & P_{ES,soc,max}^{i,t_l} > P_{ES,R}^{i,t_l} \\ P_{ES,min}^{i,t_l}, & P_{ES,soc,max}^{i,t_l} \le P_{ES,R}^{i,t_l} \end{cases} \tag{3.19}$$

Given the above charging/discharging limits, the charging and discharging power related to "frequency regulation" should meet the following constraints:

$$0 \leq P_{ES,R,d}^{i,t_l} \leq \xi_{ES,R}^{i,t_l} P_{ES,R,max}^{i,t_l}, \forall t_l \in T_1 \quad (3.20)$$

$$0 \geq P_{ES,R,c}^{i,t_l} \geq \xi_{ES,R}^{i,t_l} P_{ES,R,min}^{i,t_l}, \forall t_l \in T_1$$

The net discharging power is then the superposition of discharging power for frequency regulation and energy scheduling purposes, given as follows:

$$P_{ES,d}^{i,t_l} = P_{ES,E,d}^{i,t_l} + P_{ES,R,d}^{i,t_l}, \forall t_l \in T_1 \quad (3.21)$$

The net charging power is then the superposition of charging power for frequency regulation and energy scheduling purposes, given as follows:

$$P_{ES,c}^{i,t_l} = P_{ES,E,c}^{i,t_l} + P_{ES,R,c}^{i,t_l}, \forall t_l \in T_1 \quad (3.22)$$

The net charging and discharging power is then given by:

$$P_{ES}^{i,t_l} = P_{ES,d}^{i,t_l} + P_{ES,c}^{i,t_l}, \forall t_l \in T_1 \quad (3.23)$$

Depending on the curtailment status of the CPV ($u_{CPV}^{i,t_l}$) determined by the CO engine 16 or the MPC engine 18, the CPV can be treated as "fixed" or "curtailable" PV. For example, $u_{CPV}^{i,t_l}=0$ indicates that CPV cannot be curtailed, which implies that CPV is in fact a fixed PV; hence, it is considered as a fixed generation and not a controllable DER.

For each of the CPV in the set of CPVs, i.e., $\forall i \in CPV$:

The CPV should not be curtailed unless it is required to maintain the system constraints. Hence, a small penalty is imposed for curtailed power.

$$Q_{CPV,pen}^i = c_{CPV,pen-RPC} \sum_{t_l \in T_1} P_{CPV,cur}^{i,t_l} \Delta t_l \quad (3.24)$$

The power generated by CPV should always be within given minimum and maximum levels, specified with curtailment coefficients as well as CPV inverter:

$$P_{CPV}^{i,t_l} \leq u_{CPV}^{i,t_l} \min(\epsilon_{CPV,max}^i P_{CPV,max}^{i,t_l}, P_{CPV-inv,max}^i) + \quad (3.25)$$

$$(1 - u_{CPV}^{i,t_l}) \min(P_{CPV,max}^{i,t_l}, P_{CPV-inv,max}^i), \forall t_l \in T_1$$

$$P_{CPV}^{i,t_l} \geq u_{CPV}^{i,t_l} \max(\epsilon_{CPV,min}^i P_{CPV,max}^{i,t_l}, P_{CPV-inv,min}^i) +$$

$$(1 - u_{CPV}^{i,t_l}) \min(P_{CPV,max}^{i,t_l}, P_{CPV-inv,max}^i), \forall t_l \in T_1$$

The curtailed power by CPV may then be derived as:

$$P_{CPV,cur}^{i,t_l} = \min(P_{CPV,max}^{i,t_l}, P_{CPV-inv,max}^i) - P_{CPV}^{i,t_l}, \forall t_l \in T_1 \quad (3.26)$$

Depending on the curtailment status of CL ($u_{CL}^{i,t_l}$) determined by the CO engine 16 or the MPC engine 18, the load can be treated as "fixed" or "curtailable" load. For example $u_{CL}^{i,t_l}=0$ indicates that CL cannot be curtailed, which implies that CL is in fact a fixed load; hence, it is considered as a fixed load in the RPC engine 20.

For each CL in the set of CLs, i.e., $\forall i \in CL$:

There is a curtailment cost associated with the curtailed power by load, defined as:

$$Q_{CL,cur}^i = c_{CL}^i \sum_{t \in T_1} P_{CL,cur}^{i,t_l} \Delta t_l \quad (3.27)$$

The power generated by the CL should always be within given minimum and maximum levels, specified with minimum and maximum curtailment coefficient:

$$u_{CL}^{i,t_l} \epsilon_{CL,min}^i P_{CL,max}^{i,t_l} + (1 - u_{CL}^{i,t_l}) P_{CL,max}^{i,t_l} \leq P_{CL}^{i,t_l} \leq \quad (3.28)$$

$$u_{CL}^{i,t_l} \epsilon_{CL,max}^i P_{CL,max}^{i,t_l} + (1 - u_{CL}^{i,t_l}) P_{CL,max}^{i,t_l}, \forall t_l \in T_1$$

The curtailed load power by CL may then be derived as:

$$P_{CL,cur}^{i,t_l} = P_{CL,max}^{i,t_l} - P_{CL}^{i,t_l}, \forall t_l \in T_1 \quad (3.29)$$

It is to be noted that $u_{GT}^{i,t}$ is not a decision variable in the RPC engine 20. To determine $u_{GT}^{i,t}$, both results from the MPC engine 18 as well as actual measured data from GT will be used.

The GT's operating cost is modeled as a convex piecewise linear function, as a summation across the RPC engine's scheduling horizon:

$$Q_{GT,G}^i = \sum_{t_l \in T_1} Q_{GT,G}^{i,t_l} \quad (3.30)$$

The operating cost in each interval t, $Q_{GT,G}^{i,t_l}$, is modeled as a piece-wise linear function with parameter segment sets of $P_{GT,G}^i$ and $C_{GT,G}^i$. With the index set $L_{GT,G}^i$ denoting the segment sets of the piecewise linear function and I denoting the segment index, the operating cost can be formulated using a set of linear inequalities as follows:

$$Q_{GT,G}^{i,t_l} \geq \left( \frac{C_{GT,G}^{i,l} - C_{GT,G}^{i,l-1}}{P_{GT,G}^{i,l} - P_{GT,G}^{i,l-1}} \right) \left( P_{GT}^{i,t} - P_{GT,G}^{i,l} \right) + C_{GT,G}^{i,l} \Delta t_l, \quad (3.31)$$

$$\forall l \in [2, L_{GT,G}^i], \forall t_l \in T_1$$

The cost of deviation from power references provided by the MPC engine 18 (only in Mode II)

$$Q_{GT,ref}^i = c_{GT,ref}^i \sum_{t_l \in T_1} |P_{GT}^{i,t_l} - P_{GT,MPC}^{i,t_l}| \quad (3.32)$$

The cost function $Q_{GT,ref}^i$ is nonlinear. To linearize the problem, we replace the above cost with the following cost function, with additional constraints added to the constraints which will be described later:

$$Q_{GT,ref}^i = c_{GT,ref}^i \sum_{t_l \in T_1} y_{GT,ref}^{i,t_l} \quad (3.33)$$

The GT's power should always be within given minimum and maximum power limits, as follows:

$$u_{GT}^{i,t_l} P_{GT,min}^{i,t_l} \leq P_{GT}^{i,t_l} \leq u_{GT}^{i,t_l} P_{GT,max}^{i,t_l}, \forall t_l \in T_1 \quad (3.34)$$

The GT cannot increase or decrease its power instantly. There are ramp up and down limits for its power change, defined through the following constraints:

$$P_{GT}^{i,t_l} - P_{GT}^{i,t_l-1} \leq \Delta t_l R_{GT,up}^i, \forall t_l \in T_1 \quad (3.35)$$

$$P_{GT}^{i,t_l-1} - P_{GT}^{i,t_l} \leq \Delta t_l R_{GT,down}^i, \forall t_l \in T_1 \quad (3.36)$$

Additional constraints for linearization of cost function $Q_{GT,ref}^i$:

$$y_{GT,ref}^{i,t_l} \geq (P_{GT}^{i,t_l} - P_{GT,MPC}^{i,t_l}), \forall t_l \in T_1 \quad (3.37)$$

$$y_{GT,ref}^{i,t_l} \geq -(P_{GT}^{i,t_l} - P_{GT,MPC}^{i,t_l}), \forall t_l \in T_1$$

As previously described, the CO engine 16 in the cloud solves a comprehensive optimization problem and the following optimal values are transferred to the edge to be used in MPC engine 18 for the mathematical models described above:

Operational modes of the BESSs and their regulation power capacities
BESS charging and discharging power, acting as power references in the MPC engine 18
CPV curtailment on/off status
CL curtailment on/off status
GT scheduled power and activation status Specifically, the data transfer from the CO engine 16 in cloud to the MPC engine 18 in in the edge, $\forall i \in ES$, $\forall i \in CPV$, $\forall i \in CL$, $\forall i \in GT$, is given in Table 17 below:

TABLE 17

| Symbol | Description | Unit | Range | Type |
|---|---|---|---|---|
| BESS-Related Data: Time-series data of size $T_u$ | | | | |
| $\xi_{ES,E}^{i,t_u}$ | BESS operational mode indicator, 1: energy scheduling, 0: not activated | — | {0, 1} | B |
| $\xi_{ES,R}^{i,t_u}$ | BESS operational mode indicator, 1: frequency regulation, 0: not activated | — | {0, 1} | B |
| $P_{ES,R}^{i,t_u}$ | BESS regulation power capacity | MW | [0, ∞) | C |
| $P_{ES,E,d}^{i,t_u}$ | BESS discharging power for energy scheduling | MW | [0, ∞) | C |
| $P_{ES,E,c}^{i,t_u}$ | BESS charging power for energy scheduling | MW | [0, ∞) | C |
| CPV-Related Data: Time-series data of size $T_u$ | | | | |
| $u_{CPV}^{i,t_u}$ | Curtailment on/off status, 1: on, 0: off | — | {0, 1} | B |
| CL-Related Data: Time-series data of size $T_u$ | | | | |
| $u_{CL}^{i,t_u}$ | Curtailment on/off status, 1: on, 0: off | — | {0, 1} | B |
| GT-Related Data: Time-series data of size $T_u$ | | | | |
| $P_{GT}^{i,t_u}$ | GT scheduled power references | MW | [0, ∞) | C |
| $u_{GT}^{i,t_u}$ | GT activation status | — | {0, 1} | B |

Specifically, the data transfer from the MPC engine 18 to the RPC engine 20, $\forall i \in ES$, $\forall i \in CPV$, $\forall i \in CL$, $\forall i \in GT$, is given in Table 18 below:

TABLE 18

| Symbol | Description | Unit | Range | Type |
|---|---|---|---|---|
| BESS-related data | | | | |
| $\xi_{ES,E}^{i,t}$ (parameter in RPC) | BESS operational mode indicator, 1: energy scheduling, 0: not activated | — | {0, 1} | B |
| $\xi_{ES,R}^{i,t}$ (parameter in RPC) | BESS operational mode indicator, 1: frequency regulation, 0: not activated | — | {0, 1} | B |
| $P_{ES,R}^{i,t}$ | BESS regulation power capacity | MW | [0, ∞) | C |
| $P_{ES,E,d}^{i,t}$ | BESS discharging power reference for energy scheduling | MW | [0, ∞) | C |
| $P_{ES,E,c}^{i,t}$ | BESS charging power reference for energy scheduling | MW | (−∞, 0] | C |
| $P_{ES,soc,min}^{i,t}$ | Minimum BESS charging power complying SOC limitations | MW | (−∞, 0] | C |
| $P_{ES,soc,max}^{i,t}$ | Maximum BESS discharging power complying SOC limitations | MW | [0, ∞) | C |
| CPV-related data: Time-series data of size T | | | | |
| $u_{CPV}^{i,t}$ (parameter in RPC) | Curtailment status, 1: on, 0: off | — | {0, 1} | B |
| CL-Related Data: Time-series data of size T | | | | |
| $u_{CL}^{i,t}$ (parameter in RPC) | Curtailment on/off status, 1: on, 0: off | — | {0, 1} | B |
| GT-Related Data: Time-series data of size T | | | | |
| $P_{GT}^{i,t}$ | GT scheduled power references | MW | [0, ∞) | C |
| $u_{GT}^{i,t}$ (parameter in RPC) | GT activation status | — | {0, 1} | B |

In other words, the mid-timescale operation planning data 32 includes data that are already determined by the CO engine 16 or the MPC engine 18 and are fixed in values when the RPC engine 20 receives them. These data are passed to the RPC engine 20 as parameters and are labeled in Table 18, while the other data not labeled can be re-optimized again in RPC engine. Examples of the data treated as fixed parameters in RPC engine 20 include one or more of the binary type data shown in Table 18. It is possible that these data that are fixed in values may also alternatively or additionally include one or more continuous type data shown in Table 18. Those skilled in the art will also readily appreciate that similar data for other types of DERs may also be included. Generally, these data that are fixed in values are those that do not change frequently, i.e., in the next couple of seconds. In this manner, the problem in the RPC engine 20 can be formulated as a LP optimization problem, the solution of which can be obtained in a much shorter time compared to the time required for solving the mixed integer linear programming (MILP) optimization problems in the CO engine 16 and the MPC engine 18.

$P_{ES,soc,min}^{i,t}$ and $P_{ES,soc,max}^{i,t}$ in Table 18 are charging and discharging power rates complying with SOC limitations, respectively, which are calculated in the MPC engine 18 and are imposed on the RPC engine 20:

$\forall i \in ES, t \in T$ $$P_{ES,soc,min}^{i,t} = -\gamma \max\left(\frac{CAP_{ES}^i(SOC_{ES,max}^i - SOC_{ES,actual}^{i,t})}{\eta_{ES,c}^i \Delta t}, 0\right) \quad (4.1)$$

$$P_{ES,soc,max}^{i,t} = \gamma \max\left(\frac{CAP_{ES}^i(SOC_{ES,actual}^{i,t} - SOC_{ES,min}^i)}{\frac{\Delta t}{\eta_{ES,d}^i}}, 0\right). \quad (4.2)$$

where $0 \leq \gamma \leq 1$ is a safety factor to account for inaccuracies in measured and calculated data. These two limits are required in the RPC engine 20, as it does not model SOC constraints.

Data from Device to Optimization Engines—Battery Management System (BMS) (not Shown)

The CO and MPC engines 16, 18 execute energy scheduling in days/hours/minutes. However, the electrical power system additionally needs to balance the real-time generation and demand in second/milli-second resolution through DERs' controllers. For example, BMS can practically help to realize this balance. In addition, the RPC engine 20 utilizes the BESSs to follow the grid control signals in seconds. Consequently, the SOC levels of the BESSs may be changed by both the RPC engine 20 and the BMS (not shown). In order for the CO and MPC engines 16, 18 to output feasible solutions for energy scheduling, SOC updates from the BMS need to be feedbacked to both the CO and MPC engines 16, 18 prior to their triggering and scheduling for the future time slots by setting $SOC_{ES}^{i,start} = SOC_{ES,actual}^{i,t}$.

The data transferred from the BMS to the CO and MPC engines 16, 18, $\forall i \in ES$, is shown in Table 19 below:

TABLE 19

| Symbol | Description | Unit | Range | Type |
|---|---|---|---|---|
| $SOC_{ES, actual}^{i,t}$ | BESS actual SOC | — | [0, 1] | C |

As mentioned previously, the CO and MPC engines 16, 18 are executed with different time frequencies. For example, the CO engine 16 may be called once every 30 minutes while the MPC engine 18 may be scheduled to run once every 1 minute. The BESS SOC will be measured and stored in the database frequently (e.g., every 10 seconds) and the CO and MPC engines 16, 18 will read it prior to their execution.

Furthermore, both CO and MPC engines 16, 18 require actual operating power of the GTs pit in order to comply with ramp-up and ramp-down constraints. The time of the latest activation status change $T_{GT,switch}^{i,t}$ is also required by the CO engine 16 and MPC engine 18 (operating in Mode I) for applying activation on/off duration constraints. These data should be provided to the CO and MPC engines 16, 18 prior to each execution.

Once $P_{GT,actual}^{i,t}$ is received, it will be taken as the GT initial power in the CO and MPC engines 16, 18. Based on this actual power measurement, the on/off status of GT can be revealed (e.g., positive value indicates the GT is on, zero value indicates the GT is off). Besides, GT's actual on/off status together with $T_{GT,switch}^{i,t}$ will be used to determine the initial on/off duration of the GTs. These initializations are shown as follow:

$$P_{GT}^{i,0} = P_{GT,actual}^{i,t}, \quad (4.3)$$

$$\text{if } P_{GT}^{i,0} > 0, \text{ then } u_{GT}^{i,0} = 1, T_{GT,on}^{i,0} = t^0 - T_{GT,switch}^{i,t}, T_{GT,off}^{i,0} = 0, \quad (4.4)$$

$$\text{if } P_{GT}^{i,0} = 0, \text{ then } u_{GT}^{i,0} = 0, T_{GT,off}^{i,0} = t^0 - T_{GT,switch}^{i,t}, T_{GT,on}^{i,0} = 0. \quad (4.5)$$

As mentioned earlier, the CO and MPC engines 16, 18 are executed with different time frequencies and the actual state data will be measured and stored in the database frequently (e.g., every 10 seconds) and the CO and MPC engines 16, 18 will read it whenever needed, prior to their execution.

The data transferred from the GT controllers (not shown) to the CO and MPC engines 16, 18, $\forall i \in GT$ is shown in Table 20 below:

TABLE 20

| Symbol | Description | Unit | Range | Type |
|---|---|---|---|---|
| $P_{GT, actual}^{i, t}$ | GT actual power | MW | [0, ∞) | C |
| $T_{GT, switch}^{i, t}$ | The time of the latest GT activation status change | — | — | D |

As previously described, the real-time predictor (RTP) 14 runs on the edge to generate the blended forecast data 28 such as solar generation and load, based on 1) forecast data provided from the cloud and 2) actual measured data of solar generation and load. After the forecast data from the cloud is interpolated by the data interpolator 21, the actual measured value is blended into the interpolated forecast data 26 in the RTP 14. The inputs to the RTP include the following:

Interpolated forecast data 26 over a given time horizon (e.g., solar generation forecasts)

Current actual value (e.g., for solar generation, this is the current measured output of solar PVs)

Blending configuration, which determines the weights to be applied on the current actual value and on the forecasts from the cloud for blending the data.

The output of the RTP 14 is stored in the database 27 as timeseries data to be used by the MPC and RPC engines 18, 20. The blending function in the RTP 14 blends the real-time measured value with the interpolated forecast data 26 in order to generate more realistic forecast values. The input interpolated forecast data 26 should have the same time resolution and time window as required by the MPC and RPC engines 18, 20.

A blending coefficient in the blending function of the RTP 14 decides the weights of the measured value and the interpolated forecast value 26 in the final output of the blending function. In a linear decay blending method, the blending coefficient (weight for real-time measurement) linearly decreases with time. Thus, a timepoint closer to current time point will have a higher weight for the real-time measured value compared with the timepoints further away from the current time point.

A blending rate with linear decay may be derived as $$b_t = \alpha \times \frac{t_{end}^T - t_{start}^t}{t_{end}^T - t_{start}^1}, \forall t \in T, \quad (4.6)$$

where $t_{start}^t$ and $t_{end}^t$ are the start and end time of time slot t, respectively.

The blended output may then be given by:

$$z_t = b_t \times y_t + (1 - b_t) \times x_t, \forall t \in T, \quad (4.7)$$

where $y_t$ is the predicted data based on actual measured data and $x_t$ is the forecast data.

Advantageously, the energy management system 2 with its RPC engine 20 is able to respond to real-time energy and regulation signals in seconds, as the integer decision variables, e.g., GT activation status ($u_{GT}^{i,t}$), BESS operational modes ($\xi_{ES,E}^{i,t}$, $S_{ES,R}^{i,t}$) have already been optimized and determined by the CO engine 16 or the MPC engine 18 and the optimization problem in the RPC engine 20 becomes a linear programming problem; therefore, it is able to provide real-time or almost real-time operation planning data, i.e., power setpoints 3, for the controllers of the DERs 4. The optimization engines 16, 18, 20 of the energy management system 2 also take into consideration uncertainties in the renewable energy generation, load demand, and price forecasts, when making decisions.

Although the present invention is described as implemented in the above-described embodiments, it is not to be construed to be limited as such. It is to be appreciated that modifications and improvements may be made without departing from the scope of the present invention.

For example, although long-timescale is described as day-ahead, long-timescale can also be shorter or longer than a day. For example, long-timescale can also be as short as an hour-ahead or as long as days or even weeks ahead. And accordingly, mid-timescale may be minutes-ahead or a day or more ahead when the long-timescale is an hour-ahead or days-ahead as long as it is shorter in duration than the long-timescale.

As another example, the data interpolator 21 can be based on several interpolation techniques, such as linear interpolation or polynomial interpolation, amongst others.

As another example, the RTP 14 can be based on several blending techniques, such as flat or linear decay blending methods, amongst others.

As another example, the RTP 14 can be made optional. Without the RTP 14, the energy management system 2 can still operate with the required data for the MPC engine 18 and the RPC engine 20 coming from the data interpolator 12 and the DERs 4 measured data. There may be some potential performance degradation in terms of cost minimization.

Other types of DERs can be modeled and be then supported by the proposed framework. The considered DERs are for the purpose of exposition only.

It should be further appreciated by the person skilled in the art that one or more of the above modifications or improvements, not being mutually exclusive, may be further combined to form yet further embodiments of the present invention.

The invention claimed is:
1. A multi-timescale coordinated optimization scheduling method for an electrical power system including a plurality of distributed energy resources (DERs), the method comprising:
performing, via cloud computing using a cloud optimization engine, a long-timescale optimization scheduling for the electrical power system based at least on forecast data to obtain a long-timescale operation planning data;
determining if the long-timescale operation planning data is available;
performing, via edge computing using a model predictive control engine, a mid-timescale optimization scheduling for the electrical power system by solving a first optimization problem based on the long-timescale operation planning data and measured data of the plurality of DERs to obtain a mid-timescale operation planning data when it is determined that the long-timescale operation planning data is available;
performing, via edge computing using the model predictive control engine, the mid-timescale optimization scheduling for the electrical power system by solving a second optimization problem based on forecast data and the measured data of the plurality of DERs to obtain the mid-timescale operation planning data when it is determined that the long-timescale operation planning data is not available, the second optimization problem is different from the first optimization problem;
performing, via edge computing using a real-time predictive control engine, at least close to real-time optimization scheduling for the electrical power system based on the mid-timescale operation planning data, the measured data of the plurality of DERs and grid signals of the electrical power system to obtain a short-timescale power setpoints for the plurality of DERs; and
sending the short-timescale power setpoints to the plurality of DERs and controlling the short-timescale power setpoints;
wherein the long-timescale is longer than the mid-timescale, and the mid-timescale is longer than the short-timescale.

2. The multi-timescale coordinated optimization scheduling method according to claim 1, wherein
the first optimization problem is defined by:

$$Q_{UG,E} + Q_{UG,unc} + \sum_{i \in ES}(Q_{ES,cyc}^i + Q_{ES,dev}^i) + \sum_{i \in CPV} Q_{CPV,pen}^i + \sum_{i \in CL} Q_{CL,cur}^i + \sum_{i \in GT}(Q_{GT,G}^i + Q_{GT,ref}^i),$$

and the second optimization problem is defined by:

$$Q_{UG,E} + Q_{UG,unc} + \sum_{i \in ES}(Q_{ES,cyc}^i - Q_{ES,FR}^i) + \sum_{i \in CPV} Q_{CPV,pen}^i + \sum_{i \in CL} Q_{CL,cur}^i + \sum_{i \in GT}(Q_{GT,G}^i + Q_{GT,SU}^i)$$

wherein
$Q_{UG,E}$ is an energy procurement cost;
$Q_{UG,unc}$ is an uncontracted capacity cost;

$Q^i_{CPV,pen}$ is a curtailable photovoltaic (CPV) penalty cost;

$Q^i_{CL,cur}$ is a controllable load (CL) curtailment cost;

$Q^i_{ES,cyc}$ is a battery energy storage system (BESS) cycling aging cost;

$Q^i_{ES,FR}$ is a BESS regulation capacity revenue;

$Q^i_{Es,dev}$ is a BESS cost of deviation from engine charging/discharging power references for long-timescale optimization scheduling;

$Q^i_{GT,G}$ is a gas turbine (GT) operation cost;

$Q^i_{GT,SU}$ is a GT startup cost; and $Q^i_{GT,ref}$ is a GT cost of deviation from engine power references for long-timescale optimization scheduling.

3. The multi-timescale coordinated optimization scheduling method according to claim 1, further comprising:

obtaining interpolated long-timescale operation planning data based on the long-timescale operation planning data; and wherein performing, via edge computing, mid-timescale optimization scheduling for the electrical power system by solving a first optimization problem based on the long-timescale operation planning data and measured data of the plurality of DERs to obtain mid-timescale operation planning data comprises performing, via edge computing, the mid-timescale optimization scheduling for the electrical power system by solving the first optimization problem based on the interpolated long-timescale operation planning data, and the measured data of the plurality of DERs to obtain the mid-timescale operation planning data.

4. The multi-timescale coordinated optimization scheduling method according to claim 3, further comprising:

obtaining interpolated forecast data based on the forecast data; and obtaining blended forecast data based on the interpolated forecast data and the measured data of the plurality of DERs; and wherein performing, via edge computing, the mid-timescale optimization scheduling for the electrical power system by solving the first optimization problem based on the interpolated long-timescale operation planning data and the measured data of the plurality of DERs to obtain the mid-timescale operation planning data comprises performing, via edge computing, the mid-timescale optimization scheduling for the electrical power system by solving the first optimization problem based on the interpolated long-timescale operation planning data, the blended forecast data and the measured data of the plurality of DERs to obtain the mid-timescale operation planning data.

5. The multi-timescale coordinated optimization scheduling method according to claim 4, wherein obtaining at least one of the interpolated forecast data and the interpolated long-timescale operation planning data is performed asynchronously from the mid-timescale optimization scheduling.

6. The multi-timescale coordinated optimization scheduling method according to claim 1, wherein performing the mid-timescale optimization scheduling comprises performing Model Predictive Control (MPC)-based mid-timescale optimization scheduling.

7. The multi-timescale coordinated optimization scheduling method according to claim 1, wherein the long-timescale operation planning data comprises at least an hour-ahead planning data.

8. The multi-timescale coordinated optimization scheduling method according to claim 7, wherein the mid-timescale operation planning data comprises at least a minute-ahead operation planning data corresponding to the at least an hour-ahead planning data.

9. The multi-timescale coordinated optimization scheduling method according to claim 1, wherein the forecast data comprises at least one of price, load and renewable energy generation forecast data.

10. The multi-timescale coordinated optimization scheduling method according to claim 1, wherein the long-timescale is at least half an hour, the mid-timescale is at least one minute and the short-timescale is at least four seconds.

11. An electrical power system comprising:

a plurality of distributed energy resources (DERs); and an energy management system comprising:

a cloud computing-based long-timescale scheduler using a cloud optimization engine for a long-timescale optimization scheduling of the electrical power system based on forecast data to obtain a long-timescale operation planning data;

an edge computing-based mid-timescale scheduler using a model predictive control engine for a mid-timescale optimization scheduling of the electrical power system to obtain a mid-timescale operation planning data, wherein the mid-timescale optimization scheduling is performed by solving a first optimization problem based on the long-timescale operation planning data and measured data of the plurality of DERs if it is determined that the long-timescale operation planning data is available;

the mid-timescale optimization scheduling is performed by solving a second optimization problem based on forecast data and the measured data of the plurality of DERs if it is determined that the long-timescale operation planning data is not available, the second optimization problem is different from the first optimization problem; and an edge computing-based real-time scheduler using a real-time predictive control engine for at least close to real-time optimization scheduling of the electrical power system based on the mid-timescale operation planning data, the measured data of the plurality of DERs and grid signals of the electrical power system to obtain a short-timescale power setpoints for the plurality of DERs and send the short-timescale power setpoints to the plurality of DERs and controlling the short-timescale power setpoints;

wherein the long-timescale is longer than the mid-timescale, and the mid-timescale is longer than the short-timescale.

12. The electrical power system according to claim 11, wherein the first optimization problem is defined by:

$$Q_{UG,E} + Q_{UG,unc} + \sum_{i \in ES}(Q^i_{ES,cyc} + Q^i_{ES,dev}) + \sum_{i \in CPV} Q^i_{CPV,pen} + \sum_{i \in CL} Q^i_{CL,cur} + \sum_{i \in GT}(Q^i_{GT,G} + Q^i_{GT,ref}),$$

and the second optimization problem is defined by:

$$Q_{UG,E} + Q_{UG,unc} + \sum_{i \in ES}(Q^i_{ES,cyc} - Q^i_{ES,FR}) + \sum_{i \in CPV} Q^i_{CPV,pen} + \sum_{i \in CL} Q^i_{CL,cur} + \sum_{i \in GT}(Q^i_{GT,G} + Q^i_{GT,SU})$$

wherein
- $Q_{UG,E}$ is an energy procurement cost;
- $Q_{UG,unc}$ is an uncontracted capacity cost;
- $Q^i_{CPV,pen}$ is a curtailable photovoltaic (CPV) penalty cost;
- $Q^i_{CL,cur}$ is a controllable load (CL) curtailment cost;
- $Q^i_{ES,cyc}$ is a battery energy storage system (BESS) cycling aging cost;
- $Q^i_{ES,FR}$ is a BESS regulation capacity revenue;
- $Q^i_{ES,dev}$ is a BESS cost of deviation from engine charging/discharging power references for long-timescale optimization scheduling;
- $Q^i_{GT,G}$ is a gas turbine (GT) operation cost;
- $Q^i_{GT,SU}$ is a GT startup cost; and
- $Q^i_{GT,ref}$ is a GT cost of deviation from engine power references for long-timescale optimization scheduling.

13. The electrical power system according to claim 11, further comprising:
   a data interpolator for obtaining interpolated long-timescale operation planning data based on the long-timescale operation planning data; and
   wherein performing the mid-timescale optimization scheduling by solving the first optimization problem based on the long-timescale operation planning data and the measured data of the plurality of DERs if it is determined that the long-timescale operation planning data is available comprises
   performing the mid-timescale optimization scheduling by solving the first optimization problem based on the interpolated long-timescale operation planning data, and the measured data of the plurality of DERs if it is determined that the long-timescale operation planning data is available.

14. The electrical power system according to claim 13, wherein:
   the data interpolator further obtains interpolated forecast data based on the forecast data; and
   wherein performing the mid-timescale optimization scheduling by solving the first optimization problem based on the interpolated long-timescale operation planning data and the measured data of the plurality of DERs if it is determined that the long-timescale operation planning data is available comprises
   performing the mid-timescale optimization scheduling by solving the first optimization problem based on the interpolated long-timescale operation planning data, the interpolated forecast data and the measured data of the plurality of DERs if it is determined that the long-timescale operation planning data is available.

15. The electrical power system according to claim 14, wherein the data interpolator obtains at least one of the interpolated forecast data and the interpolated long-timescale operation planning data asynchronously from the mid-timescale optimization scheduling.

16. The electrical power system according to claim 11, wherein the mid-timescale optimization scheduling comprises Model Predictive Control (MPC)-based mid-timescale optimization scheduling.

17. The electrical power system according to claim 11, wherein the long-timescale operation planning data comprises at least one hour-ahead planning data.

18. The electrical power system according to claim 17, wherein the mid-timescale operation planning data comprises at least a minute-ahead operation planning data corresponding to the at least one hour-ahead planning data.

19. The electrical power system according to claim 11, wherein the forecast data comprises at least one of price, load and renewable energy generation forecast data.

20. The electrical power system according to claim 11, wherein the long-timescale is at least half an hour, the mid-timescale is at least one minute and the short-timescale is at least four seconds.

* * * * *